(12) United States Patent
Matsuda

(10) Patent No.: US 8,239,770 B2
(45) Date of Patent: Aug. 7, 2012

(54) CONTENT DISPLAY SYSTEM

(75) Inventor: Munehisa Matsuda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 203 days.

(21) Appl. No.: 12/625,584

(22) Filed: Nov. 25, 2009

(65) Prior Publication Data

US 2010/0131855 A1 May 27, 2010

(30) Foreign Application Priority Data

Nov. 27, 2008 (JP) ................................. 2008-302657

(51) Int. Cl.
*G06F 3/00* (2006.01)

(52) U.S. Cl. ......................... 715/738; 715/739; 715/736

(58) Field of Classification Search .................. 715/738, 715/739, 733

See application file for complete search history.

(56) References Cited

U.S. PATENT DOCUMENTS

| | | | |
|---|---|---|---|
| 5,999,698 A | 12/1999 | Nakai et al. | |
| 6,249,817 B1 | 6/2001 | Nakabayashi et al. | |
| 7,088,234 B2 | 8/2006 | Naito et al. | |
| 7,401,294 B2* | 7/2008 | Chang et al. .................. | 715/733 |
| 7,548,915 B2 | 6/2009 | Ramer et al. | |
| 2002/0069239 A1* | 6/2002 | Katada et al. ................. | 709/202 |
| 2002/0073235 A1* | 6/2002 | Chen et al. .................... | 709/246 |
| 2002/0143936 A1* | 10/2002 | Yu ................................ | 709/224 |
| 2003/0078038 A1 | 4/2003 | Kurosawa et al. | |
| 2003/0105869 A1 | 6/2003 | Matsui et al. | |
| 2003/0110266 A1* | 6/2003 | Rollins et al. ................. | 709/227 |
| 2003/0184793 A1 | 10/2003 | Pineau | |
| 2003/0195963 A1* | 10/2003 | Song et al. .................... | 709/227 |
| 2004/0133847 A1 | 7/2004 | Iino et al. | |
| 2005/0066037 A1* | 3/2005 | Song et al. .................... | 709/227 |

(Continued)

FOREIGN PATENT DOCUMENTS

JP              10056491 A     2/1998

(Continued)

OTHER PUBLICATIONS

NetNews Wire 3.1 for Mac OS X, Online article, Jul. 30, 2008, pp. 1-3, XP002556295. <http://web.archive.org/web/20080730165103/www.newsgator.com/Individuals/Netnewswire/Defaultaspx>.

(Continued)

*Primary Examiner* — Boris Pesin
*Assistant Examiner* — Daeho Song
(74) *Attorney, Agent, or Firm* — Banner & Witcoff, Ltd.

(57) ABSTRACT

A content display system may be provided with a communication device and an information display device. The information display device may display contents by utilizing a browser. The communication device may store location information of summarized content information, acquire the summarized content information based on the location information of the summarized content information, display titles included in the summarized content information, allow a user to select at least one title from the titles, specify first location information of a first content corresponding to a first title selected by the user, and send a command for displaying the first content corresponding to the first location information. The information display device may receive the command, and activate the browser in accordance with a first type of command in a specific case where the browser has been closed which had been activated in accordance with an other first type of command having been sent from the communication device before receiving the first type of command.

6 Claims, 16 Drawing Sheets

U.S. PATENT DOCUMENTS

| | | | |
|---|---|---|---|
| 2005/0097214 A1* | 5/2005 | Chen et al. | 709/231 |
| 2005/0144032 A1 | 6/2005 | Shimoda et al. | |
| 2005/0289468 A1* | 12/2005 | Kahn et al. | 715/738 |
| 2006/0079214 A1 | 4/2006 | Mertama et al. | |
| 2006/0112102 A1* | 5/2006 | Shafron | 707/9 |
| 2006/0182418 A1 | 8/2006 | Yamagata et al. | |
| 2007/0083468 A1* | 4/2007 | Wetherell | 705/51 |
| 2007/0086051 A1 | 4/2007 | Kunori | |
| 2007/0112934 A1* | 5/2007 | Inoue et al. | 709/217 |
| 2007/0136673 A1 | 6/2007 | Minamida | |
| 2007/0136778 A1 | 6/2007 | Birger et al. | |
| 2007/0174423 A1* | 7/2007 | Yoshida | 709/217 |
| 2007/0226734 A1* | 9/2007 | Lin et al. | 717/177 |
| 2007/0250643 A1* | 10/2007 | Pyhalammi et al. | 709/245 |
| 2008/0037062 A1 | 2/2008 | Omino et al. | |
| 2008/0060043 A1 | 3/2008 | Malik | |
| 2008/0082941 A1* | 4/2008 | Goldberg et al. | 715/810 |
| 2008/0140674 A1* | 6/2008 | Ishikawa | 707/10 |
| 2008/0160974 A1* | 7/2008 | Vartiainen et al. | 455/414.3 |
| 2008/0274767 A1 | 11/2008 | Sainton et al. | |
| 2009/0006477 A1 | 1/2009 | Oshita et al. | |
| 2009/0013071 A1 | 1/2009 | Matoba et al. | |
| 2009/0031375 A1 | 1/2009 | Sullivan et al. | |
| 2009/0083373 A1 | 3/2009 | Matoba et al. | |

FOREIGN PATENT DOCUMENTS

| | | | |
|---|---|---|---|
| JP | 11212995 A | 8/1999 | |
| JP | 2001-111607 | 4/2001 | |
| JP | 2001265686 A | 9/2001 | |
| JP | 2002092035 A | 3/2002 | |
| JP | 2002-247239 | 8/2002 | |
| JP | 2002-268968 | 9/2002 | |
| JP | 2002-278871 | 9/2002 | |
| JP | 2002-297492 | 10/2002 | |
| JP | 2002351765 A | 12/2002 | |
| JP | 2003076707 A | 3/2003 | |
| JP | 2003-108472 | 4/2003 | |
| JP | 2004096158 A | 3/2004 | |
| JP | 2004098413 A | 4/2004 | |
| JP | 2005-157565 | 6/2005 | |
| JP | 2005520255 T | 7/2005 | |
| JP | 2006215741 A | 8/2006 | |
| JP | 2006243985 A | 9/2006 | |
| JP | 2006260343 A | 9/2006 | |
| JP | 2006-277276 | 10/2006 | |
| JP | 2006344073 A | 12/2006 | |
| JP | 2007141215 A | 6/2007 | |
| JP | 2007157073 A | 6/2007 | |
| JP | 2007158613 A | 6/2007 | |
| JP | 2007164389 A | 6/2007 | |
| JP | 2008022548 A | 1/2008 | |
| JP | 2008-040991 | 2/2008 | |
| JP | 2008071169 A | 3/2008 | |
| JP | 2008-278266 | 11/2008 | |
| JP | 2009015713 A | 1/2009 | |
| JP | 2009075967 A | 4/2009 | |
| WO | 03079279 A1 | 9/2003 | |

OTHER PUBLICATIONS

European Search Report for Application No. 09251960.2-2201, mailed on Dec. 2, 2009.

European Office Action for application No. 09251960.2 mailed Aug. 29, 2011.

U.S. Office Action for U.S. Appl. No. 12/537,668 mailed Aug. 31, 2011.

"Dirty News Reader displays titles of distributed articles on RSS sites like an electronic signboard" May 26, 2004, Impress Corporation, Tomoyuki Otsu; http://www.forest.impress.co.jp/article/2004/05/26/dirtynewsreader.html.

Co-pending U.S. Appl. No. 12/537,668.

Notification of Reasons for Rejection in corresponding Japanese Application 2008-203884 mailed on May 25, 2010.

Decision of Rejection in corresponding Japanese Application No. 2008-203884 mailed on Aug. 17, 2010.

Notification for Reasons for Rejection for Japanese Patent Application No. 2008-302657 mailed Aug. 31, 2010.

Notification for Reasons for Rejection for Japanese Patent Application No. 2008-243945 mailed Sep. 28, 2010.

Final office action for U.S. Appl. No. 12/537,668 mailed Mar. 2, 2012.

* cited by examiner

CONTENT DISPLAY SYSTEM

CROSS-REFERENCE TO RELATED APPLICATIONS

This application claims priority to Japanese Patent Application No. 2008-302657, filed on Nov. 27, 2008, the contents of which are hereby incorporated by reference into the present application.

TECHNICAL FIELD

The present specification discloses a system for displaying contents published on a network.

DESCRIPTION OF RELATED ART

A variety of contents is published on a network. A server that publishes summarized content information including a URL and a title of each content is connected to the network. One example of the summarized content information is feed information. Formats for the feed information include, for example, RSS and Atom. A software for acquiring the feed information from the server and displaying a plurality of contents based on the feed information is disclosed on a website (http://www.forest.impress.co.jp/article/2004/05/26/dirtynewsreader.html) located on the Internet on Jul. 29, 2008, titled "Dirty News Reader displays titles of distributed articles on RSS sites like an electronic signboard", published May 26, 2004 by Impress Corporation and written by Tomoyuki Otsu. When this software is installed on a PC, a user can view the title of each content. When the user clicks on one of the titles, the PC activates a browser, and accesses the URL of the content corresponding to that title. The content is thereby displayed on the PC.

SUMMARY

Summarized content information can be viewed without any problem even on a comparatively small display unit, because the summarized content information is information (title, etc.) in which the content is summarized. However, unlike the summarized content information, the content may include a large number of letter strings. In addition, the content may also include image data. When the content is displayed on a small display unit, the user must scroll through several screens in order to see all of the content. This operation is cumbersome for the user, and moreover, it would be difficult to view the entire information. The present specification discloses technology that can eliminate these types of inconveniences.

One type of technology disclosed in the present specification is a content display system. The content display system may comprise a communication device and an information display device configured to be connected with the communication device in a communicable manner. The information display device may be configured to display a content by utilizing a browser. The aforementioned term "communication device" is a concept including any device that can be connected with the information display device in a communicable manner. The communication device may be, but not limited to, a printer, scanner, multi-function device, or portable terminal (mobile phone, PDL, etc.). The aforementioned term "information display device" is a concept including any device that can display information. The information display device may be, but not limited to, a PC, or television.

The communication device may comprise a location information storage unit, a summarized content information acquiring unit, a title display unit, a title selection allowing unit, a location information specifying unit, and a command sending unit. The location information storage unit may be configured to store location information of summarized content information. The aforementioned term "location information" is a concept including any information that can specify a location of content. The location information may be, but not limited to, URL (Uniform Resource Locator). The summarized content information may include location information of each content and a title of each content. The summarized content information acquiring unit may be configured to acquire the summarized content information based on the location information of the summarized content information. The title display unit may be configured to display titles included in the summarized content information. The title selection allowing unit may be configured to allow a user to select at least one title from the titles. The location information specifying unit may be configured to specify, from the summarized content information, first location information of a first content corresponding to a first title selected by the user. The command sending unit may be configured to send, to the information display device, a command for displaying the first content corresponding to the first location information. The information display device may comprise a command receiving unit and a browser activating unit. The command receiving unit may be configured to receive the command. The browser activating unit may be configured to newly activate the browser in accordance with a first type of command in a specific case where the browser has been closed which had been activated in accordance with an other first type of command having been sent from the communication device before receiving the first type of command.

DETAILED DESCRIPTION OF THE PREFERRED EMBODIMENT (First Embodiment)

Figure 1:
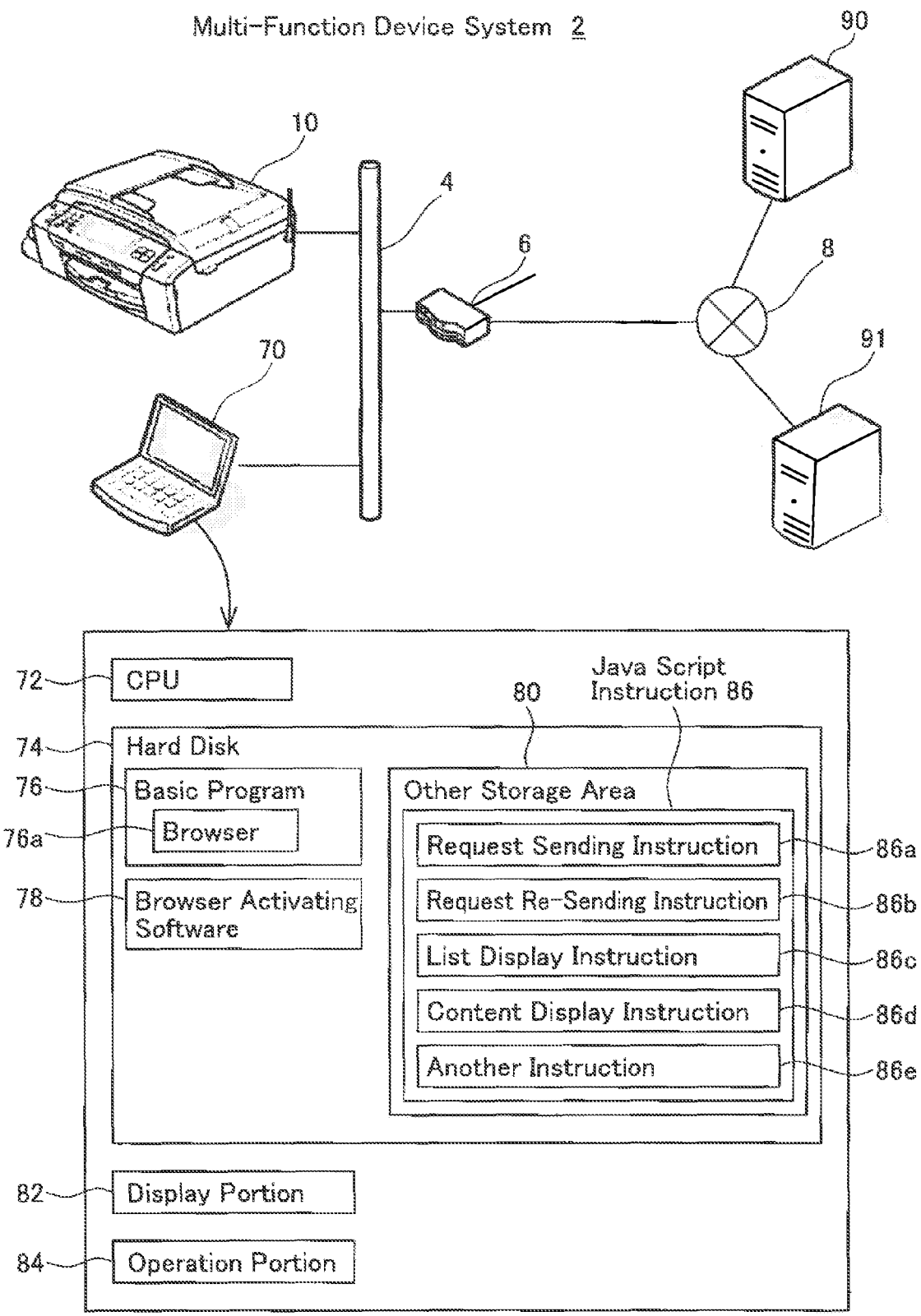
FIG. 1 shows the configuration of a multi-function device system.

An embodiment will be described with reference to the drawings. The multi-function device system 2 as shown in FIG. 1 comprises a multi-function device 10, a PC 70, and a plurality of content servers 90, 91. Although only one multi-function device 10, one PC 70, and two content servers 90, 91 are shown in FIG. 1, the exact numbers of these can be changed as desired. The multi-function device 10 is connected to a LAN line 4. PC 70 is connected to the LAN line 4. The LAN line 4 is connected to the Internet 8 via a router 6. Each content server 90, 91 is connected to the Internet 8. In the present embodiment, the content server 90 publishes one site, and the content server 91 publishes another site. Each site includes a plurality of contents. Furthermore, each content server (e.g., 90) stores feed information (e.g., RSS type feed information) which is summarized information of the plurality of contents that the content server includes.

(Configuration of the PC)

FIG. 1 shows the schematic configuration of PC 70. The PC 70 has a CPU 72, a hard disk 74, a display portion 82, an operation portion 84, etc. Although not shown in FIG. 1, the PC 70 has a network interface that configures itself to be connected to the LAN line 4.

The CPU 72 executes various processes in accordance with programs 76, 78 stored in the hard disk 74. The processes executed by the CPU 72 will be described in detail later. A basic program 76 is a program for controlling basic operations of the PC 70. The basic program 76 includes, e.g., a browser 76a for downloading and displaying one or more contents from one or more sites on the Internet 8. A user can activate the browser 76a by, e.g., performing a predetermined operation on the operation portion 84. A program for activating the browser 76a by the user's operation on the operation portion 84 is not a browser activating software 78 (to be described), but is included in the basic program 76. The browser activating software 78 is a program to activate the browser 76a in accordance with a command from the multi-function device 10. The browser activating software 78 is installed on the PC 70 from, e.g., a computer-readable medium. The browser activating software 78 may, e.g., be downloaded from a site on the Internet 8 for installation.

The hard disk 74 has an other storage area 80. The other storage area 80 stores a Java Script instruction 86. The browser 76a activated by the browser activating software 78 executes processes in accordance with the Java Script instruction 86. The Java Script instruction 86 includes instructions 86a to 86e described using Java Script (registered trademark). A request sending instruction 86a commands the browser 76a to send a request to the multi-function device 10 when the browser activating software 78 has activated the browser 76a. A request re-sending instruction 86b commands the browser 76a to re-send the request to the multi-function device 10 if a response to the former request has been received. A list display instruction 86c commands the browser 76a to display a list 204 in a list display area 202 (to be described: see FIG. 16) and to add a content title to the list 204. A content display instruction 86d commands the browser 76a to display contents in a content display area 206 (to be described: see FIG. 16). Another instruction 86e commands the browser 76a to, e.g., delete the content title from the list 204 and to clear the list 204 in accordance with a command from the multi-function device 10. The processes executed by the browser 76a in accordance with the Java Script instruction 86 will be described in detail later. The Java Script instruction 86 is installed on the PC 70 front, e.g., a computer readable medium. Further, the Java Script instruction 86 may, e.g. be downloaded from a site on the Internet 8 for installation.

The display portion 82 is capable of displaying a variety of information. The display portion 82 has a comparatively large display screen. The display portion 82 has a display screen larger than a display panel 50 (see FIG. 2) of the multi-function device 10. The operation portion 84 includes a keyboard and a mouse. The user can input commands and information to the PC 70 by operating the operation portion 84.

(Configuration of the Multi-Function Device)

Figure 2:
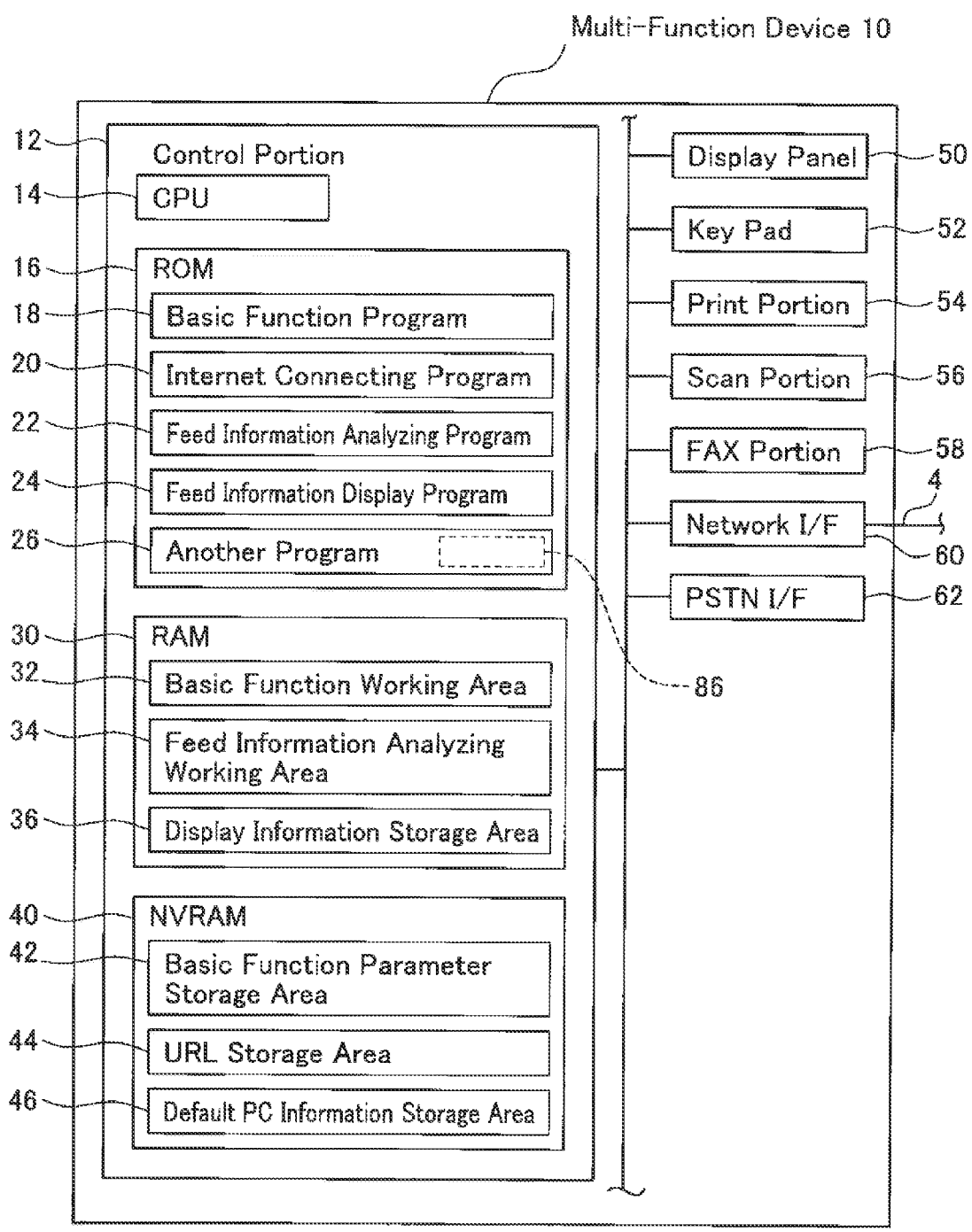
FIG. 2 shows the configuration of a multi-function device.

FIG. 2 shows the configuration of the multi-function device 10. The multi-function device 10 has a control portion 12, a display panel 50, a key pad 52, a print portion 54, a scan portion 56, a fax portion 58, a network interface 60, a PSTN interface 62, etc. The control portion 12 has a CPU 14, ROM 16, RAM 30, NVRAM 40, etc.

The CPU 14 executes various processes in accordance with programs 18 to 26 stored in the ROM 16. The processes executed by the CPU 14 will be described in detail later. The ROM 16 stores various programs 18 to 26. A basic function program 18 is a program for controlling basic operations of the multi-function device 10. The basic function program 18 includes, e.g., a program for creating display data displayed on the display panel 50. Further, the basic function program 18 includes programs for controlling, e.g., the print portion 54, the scan portion 56, the fax portion 58, etc. An Internet connecting program 20 is a program for connecting to the Internet 8. A feed information analyzing program 22 is a program for analyzing feed information acquired from the content servers 90, 92 and for creating information (termed "display information" below) to be displayed on the display panel 50. A feed information display program 24 is a program for displaying the display information. A program. 26 is a program other than the programs 18 to 24. Although the program 26 is shown as including the Java Script instruction 86 in FIG. 2, this configuration will be utilized in the second embodiment (to be described).

RAM 30 has various storage areas 32 to 36. A basic function working area 32 is a storage area for storing various types of data generated during the execution of processes in accordance with the basic function program 18. A feed information analyzing area 34 is a storage area for storing various types of data generated during the execution of processes in accordance with the feed information analyzing program 22. A display information storage area 36 is a storage area for storing the display information generated in accordance with the feed information analyzing program 22.

NVRAM 40 has various storage areas 42 to 46. A basic function parameter storage area 42 is a storage area for storing various parameters (e.g., print settings, scan settings,) used when the CPU 14 executes processes in accordance with the basic function program 18. A URL storage area 44 is a storage area for storing URLs for feed information in each content server 90, 91. For example, the user must register in order to receive contents from each content server 90, 91. This registration may be performed by using the multi-function device 10, or may be performed by using the PC 70. For example, if the user has used the PC 70 to register in order to receive contents from the content server 90, the URL of the feed information in the content server 90 will be sent from the PC 70 to the multi-function device 10. In this way, the URL of the feed information in the content server 90 will be stored in the URL storage area 44. A default PC information storage area 46 stores information for identifying the IP address of a PC or the host name of a PC, etc. The user can input the IP address of a desired PC (PC 70 in the present embodiment) into the multi-function device 10. The default PC information storage area 46 stores the IP address and host name input by the user.

The display portion 50 can display various information. The display screen of the display panel 50 is smaller than the display screen of the PC 70. The display panel 50 functions as a touch panel. The key pad 52 includes a plurality of keys. The user can input various commands and information into the multi-function device 10 by operating the key pad 52. The print portion 54 has a print mechanism such as ink jet type, laser type, etc. The scan portion 56 has a reading mechanism such as CCD, CIS, etc. The fax portion 58 performs various operations in order to perform fax communications. The network interface 60 is connected to the LAN line 4. The multi-function device 10 can communicate with the PC 70 and access the Internet 8. The PSTN interface 62 is connected to a PSTN (Public Switched Telephone Network) not illustrated in the drawings. The PSTN is used when performing fax or telephone communications.

(Storage Details of the URL Storage Area)

Figure 3:
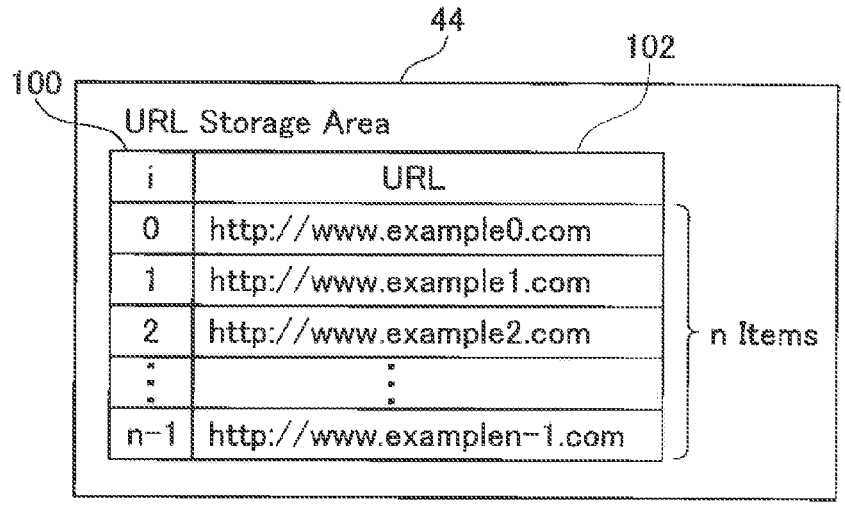
FIG. 3 shows an example of the stored contents of a URL storage area.

Next, the storage details of the URL storage area 44 of the NVRAM 40 (see FIG. 2) will be explained. As shown in FIG. 3, the URL storage area 44 can store URLs 102 of feed information in each content server 90, 91. In other words, the URL storage area 44 can store URLs 102 of the feed information for each site. In the example of FIG. 3, n items of URL 102 are stored. An identification number 100 is assigned to each URL 102. In the present embodiment, the identification number 100 is represented with the symbol "i".

(Storage Details of the Display Information Storage Area)

Figure 4:
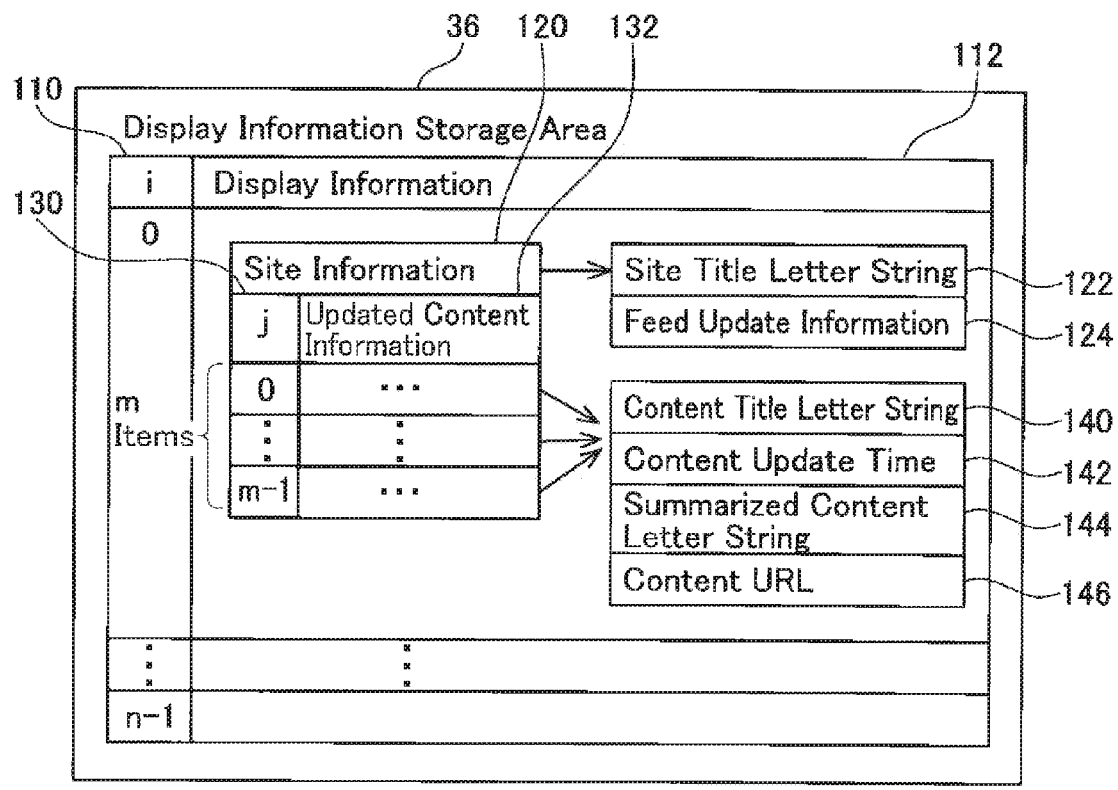
FIG. 4 shows an example of the stored contents of a display information storage area.

Next, the storage details of the display information storage area 36 of the RAM 30 (see FIG. 2) will be explained. As shown in FIG. 4, the display information storage area 36 can store display information 112 for each URL stored in the URL storage area 44. In other words, the display information storage area 36 can store display information 112 for each site stored in the URL storage area 44. As noted above, n items of URL 102 (n is an integer equal to 1 or more) are stored in the URL storage area 44 (see FIG. 3). Because of this, n items of display information 112 are stored in the display information storage area 36. An identification number 110 is assigned to each item of display information 112. In the present embodiment, the identification number 110 is represented with the symbol "i".

The data structure of each individual item of display information 112 will be explained. The display information 112 includes site information 120. The site information 120 includes a site title letter string 122 and feed update information 124. The site title letter string 122 is a letter string of the title of a site. This title can also be restated as "the name of a site". Feed update information 124 is information relating to the time at which the feed information in a content server was updated (time-related information of the latest update).

The display information 112 includes updated content information 132. The number of updated content information 132 is equal to the number of contents in a site. For example, in FIG. 4, the display information 112 corresponding to "i=0" has m items of updated content information 132 (m is an integer equal to 1 or more). This means that the site corresponding to "i=0" has m items of content. For example, if there is a content related to a weather forecast and a content related to sports in a predetermined site, the display information 112 related to that site will have two items of updated content information 132. An identification number 130 is assigned to each updated content information 132. In the present embodiment, the identification number 130 is represented with the symbol "j".

Each updated content information 132 includes a content title letter string 140, content update time 142, a summarized content letter string 144, and a content URL 146. In the aforementioned example, the updated content information 132 corresponding to the item of content related to a weather forecast includes information 140 to 146, and the updated content information 132 corresponding to the content related to sports also includes the information 140 to 146. The content title letter string 140 is a letter string of the title of a content. This title can also be restated as "the name of a content". The title of content is a letter string that is smaller than the entire letter string of the content, and is a letter string that reflects the details of the content. The content update time 142 is information relating to a time at which the content in a content server was updated (time-related information of the latest update). The summarized content letter string 144 is a letter string in which the content has been summarized. In other words, the summarized content letter string 144 is a letter string that is larger than the title of the content, but is smaller than the entire letter string of the content, and is a letter string that reflects the details of the content. The content URL 346 is the URL of the item of content.

(Processes Executed by Multi-Function Device 10)
(Feed Information Analyzing Process)

Figure 5:
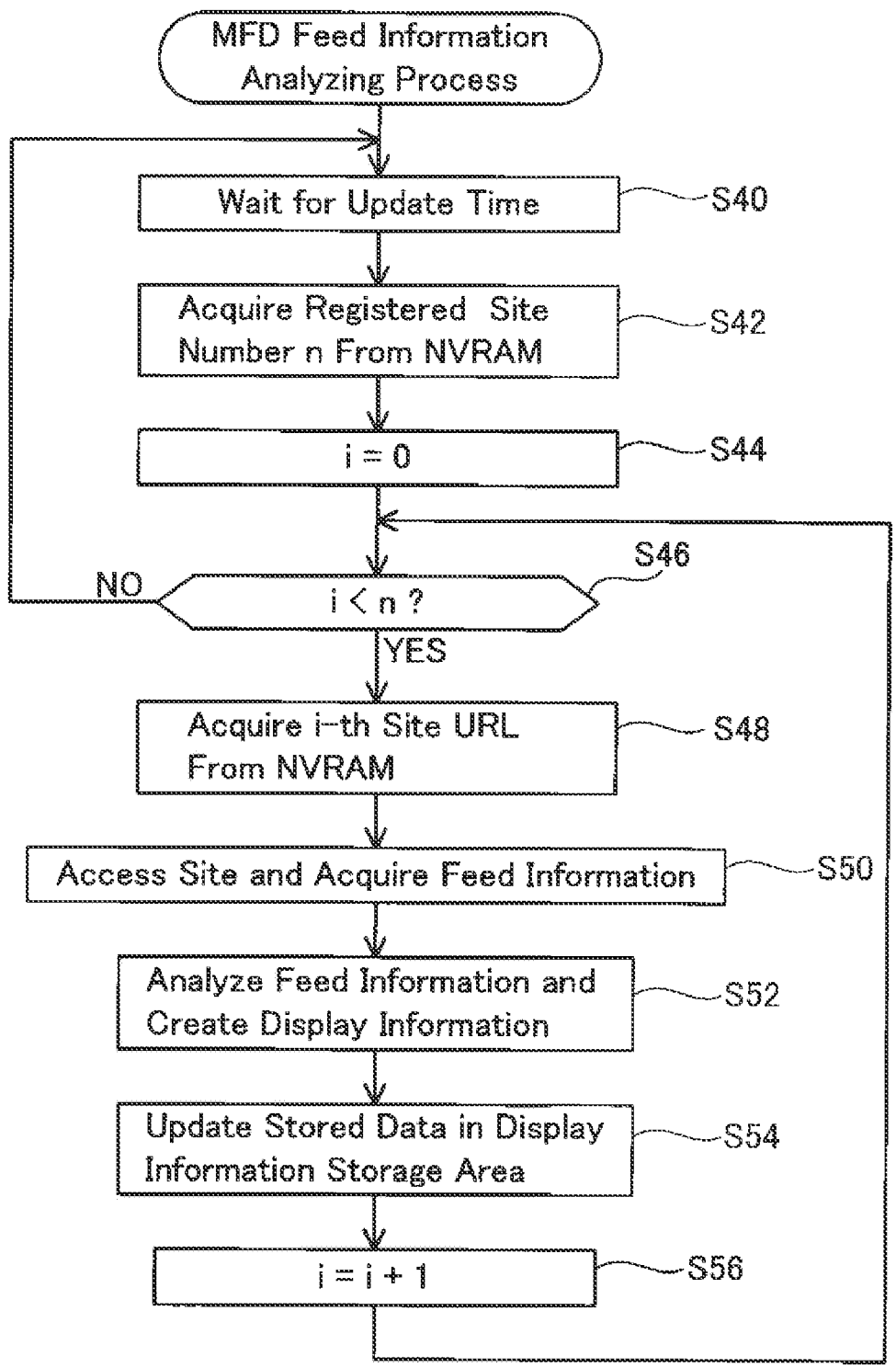
FIG. 5 shows a flowchart of a feed information analyzing process executed by the multi-function device.

Next, processes executed by the CPU 14 of the multi-function device 10 will be explained with reference to FIG. 5. First, a feed information analyzing process for the CPU 14 of the multi-function device 10 to acquire and analyze feed information will be explained. The feed information analyzing process will run as an independent task, and is executed in accordance with the internet connecting program 20 and the feed information analyzing program 22 (see FIG. 2) from since when the multi-function device 10 is activated.

The CPU 14 waits until an update time has arrived (S40). The update time may, for example, be set by the user, or may be determined by a program. When the update time arrives, the CPU 14 proceeds to S42. In S42, the CPU 14 acquires the number of URLs (number of sites) stored in the URL storage area 44 of the NVRAM (see FIG. 2). As shown in FIG. 3, in the present embodiment, n items of URL are stored in the URL storage area 44. Because of this, the CPU 14 acquires the number "n" in S42. Next, the CPU 14 initializes the counter i (S44). The CPU 14 then determines whether the counter i is smaller than n (S46). In the event that the answer is YES here, the CPU 14 proceeds to S48.

In S48, the CPU 14 acquires the URL of the i-th site from the URL storage area 44. For example, if the URL of the 0-th site is to be acquired, in the example of FIG. 3, "http://www.example0.com" will be acquired. Next, the CPU 14 accesses, in accordance with the Internet connecting program 20, the URL acquired in S48 and acquires feed information (S50). The feed information includes the site information 120 and updated content information 132 shown in FIG. 4. The CPU 14 then generates the display information 112 shown in FIG. 4 by analyzing the feed information (S52). The CPU 14 stores the display information 112 generated in S52 in the display information storage area 36 (S54). For example, when display information 112 is generated for the 0-th site, the CPU 14 clears the old display information 112 associated with the number "i=0", and stores new display information 112 associated with the number "i=0". Next, the CPU 14 adds "1" to the counter i (S56), and returns to S46. By executing the process of FIG. 5, the latest feed information for each site is stored in the display information storage area 36.

(Display Process)

Figure 6:
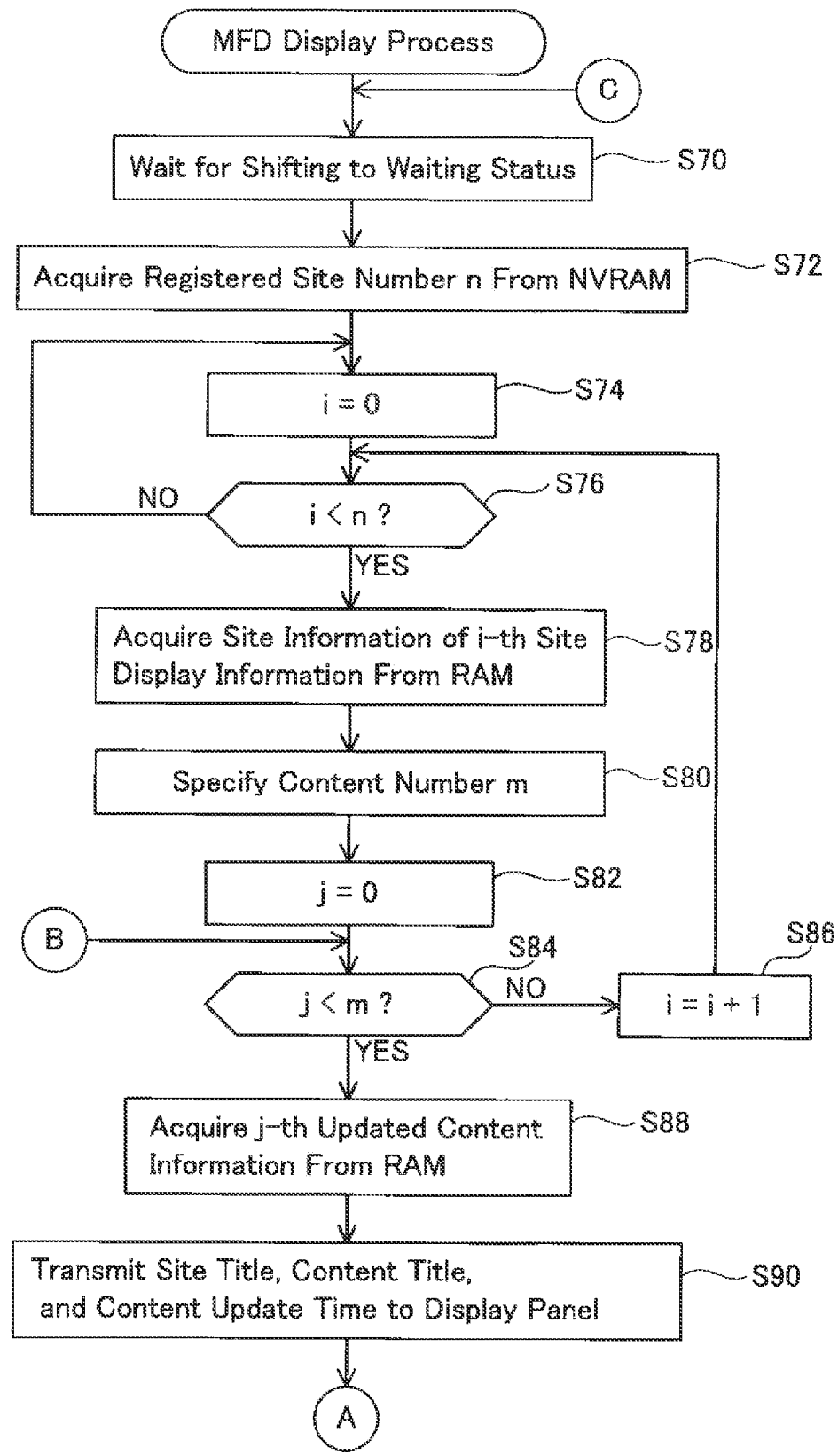
FIG. 6 shows a flowchart of a display process executed by the multi-function device.

Next, a display process for the CPU 14 of the multi-function device 10 to display the feed information will be explained with reference to FIGS. 6 and 7. The display process will run as an independent task, and is executed in accordance with the feed information display program 24 (see FIG. 2) from since when the multi-function device 10 is activated.

Figure 12:
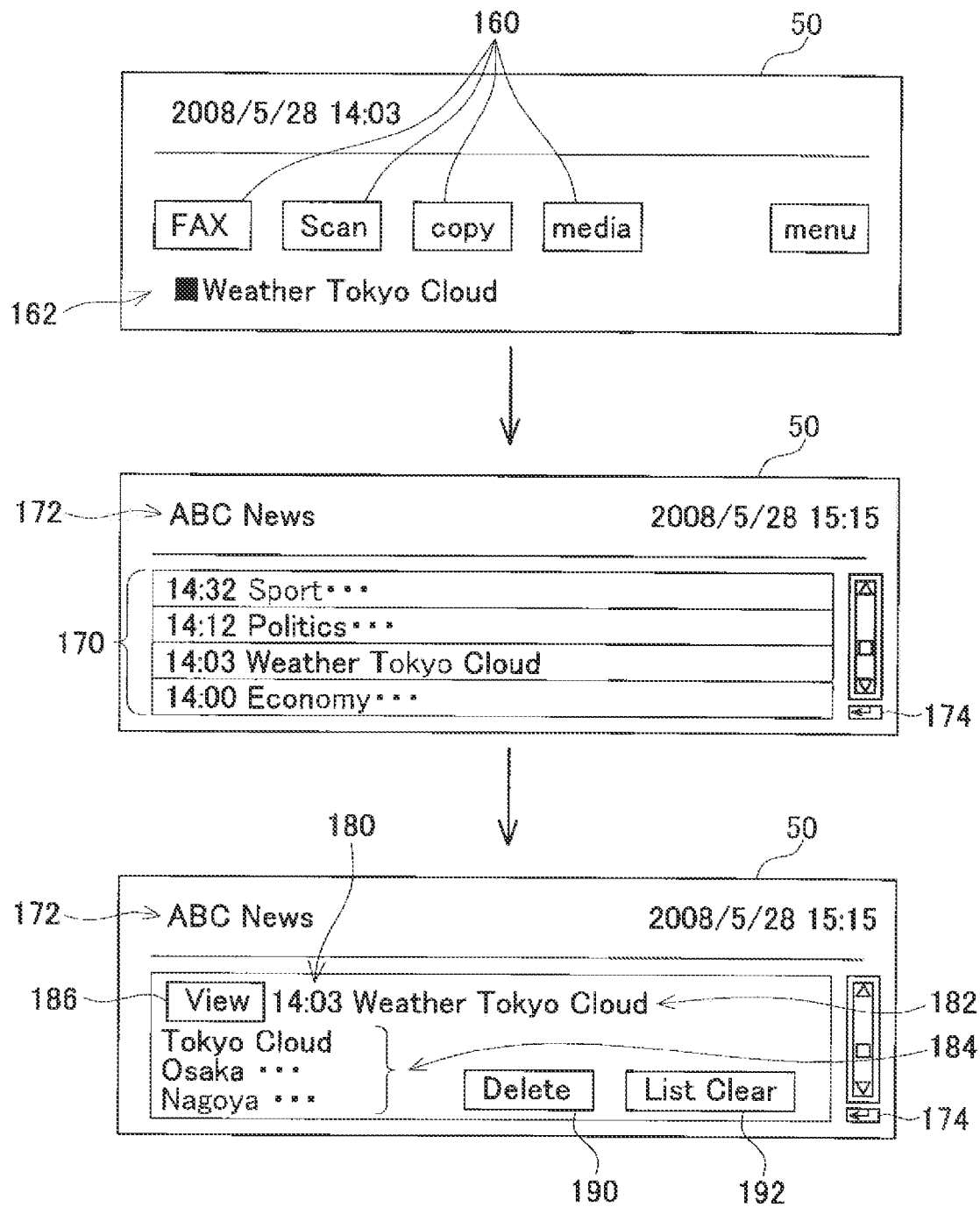
FIG. 12 shows how the displayed contents of a display panel change.

The multi-function device 10 has a plurality of states, such as a power saving state, a waiting state, a function execution state, etc. In the power saving state, nothing will be displayed on the display panel 50 (the display panel 50 is turned off). When an operation for instructing a process is performed on the key pad 52 during the power saving state, the multi-function device 10 shifts to the waiting state. In the waiting state, information for selecting a function will be displayed on the display panel 50 (the display panel 50 is turned on). The uppermost illustration shown in FIG. 12 shows an example of the display panel 50 in which a button 160 for selecting a function is displayed. The user can input a function execution command into the multi-function device 10 by operating the button 160. In this case, the multi-function device 10 shifts to the function execution state. In the function execution state, information relating to the function being executed will be displayed on the display panel 50 (e.g. the number of copies, etc.). Note that a function execution command can also be input into the multi-function device 10 during the power saving state. For example, a print command from the PC 70 can be input into the multi-function device 10 in the power saving state. In this case as well, the multi-function device 10 shifts to the function execution state.

When the function being executed in the multi-function device 10 is completed, the multi-function device 10 shifts to the waiting state (but may instead shift to the power saving state). In addition, if an event has not occurred in a predetermined time period during the waiting state (operation of the display panel 50 or the key pad 52, a print command from the PC 70, etc.), the multi-function device 10 shifts to the power saving state.

The CPU 14 waits until the multi-function device 10 has shifted from the power saving state or the function execution state to the waiting state (S70). When the multi-function device 10 has shifted to the waiting state, the CPU 14 proceeds to S72. In S72, the CPU 14 acquires the URL number (site number) stored in the URL storage area 44 (see FIG. 2) of the NVRAM (S72). This process is identical to the process of S42 in FIG. 5. In the present embodiment, the CPU 14 acquires "n" in S72. Next, the CPU 14 initializes the counter i (S74). The CPU 14 then determines whether the counter i is smaller than n (S76). In the event that the answer is YES here, the CPU 14 proceeds to S78.

In S78, the CPU 14 acquires the site information included in the display information for the i-th site from the display information storage area 36 of the RAM 30. For example, with the 0-th site, in the example of FIG. 4, the site information 120 is acquired (the site title letter string 122 and the feed update information 124). Next, the CPU 14 specifies the content number of the i-th site (S80). For example, with the 0-th site in FIG. 4, there are m items of content. In this case, the CPU 14 specifies "m" in S80. Next, the CPU 14 initializes the counter j (S82). The CPU 14 determines whether the counter j is smaller than m (S84). In the event that the answer is YES here, the CPU 14 proceeds to S88.

In S88, the CPU 14 acquires the j-th updated content information for the i-th site from the display information storage area 36 of the RAM 30. In this way, a content title letter string 140, content update time 142, a summarized content letter string 144, and a content URL 146 for one item of content is acquired. Next, the CPU 14 sends the site title letter string 122 acquired in S78, the content title letter string 140 acquired in S88, and the content update time 142 acquired in S88 to the display panel 50 (S90). As a result, as shown in the uppermost illustration of FIG. 12, the content title letter string 162 is displayed on the display panel 50. Note that the content title letter string 162 moves (e.g., from right to left). In other words, the content title letter string 162 is displayed in a scrolling manner. Note that the site title letter string 122 and the content update time 142 may be displayed on the display panel 50, or may not be displayed thereon. The CPU 14 proceeds to S100 of FIG. 7 when S90 is completed.

In S100, the CPU 14 waits until an event occurs. If an event occurs, the CPU 14 proceeds to S102. In S102, the CPU 14 determines whether the scrolling (telop) display of one content title letter string 162 has ended. If the answer is YES here, the CPU 14 adds "1" to the counter j (S104), and proceed to S84 of FIG. 6. If it is determined in S84 that the counter j is smaller than m, the CPU 14 executes S88 and S90 again. In this way, the content title letter string 162 is displayed as a scrolling display based upon the next updated content information (e.g., the 1st (j=1) updated content information). When the content title letter string 162 is displayed as a scrolling display based upon the entire updated content information of one site, the answer is determined to be NO in S84. In this case, the CPU 14 adds "1" to the counter i (S86), and the processes of S78 to S90 is executed with respect to the next site (e.g., the 1st (i=1) site). In this way, the content title letter string 162 is displayed as a scrolling display based upon the updated content information of the next site.

Figure 7:
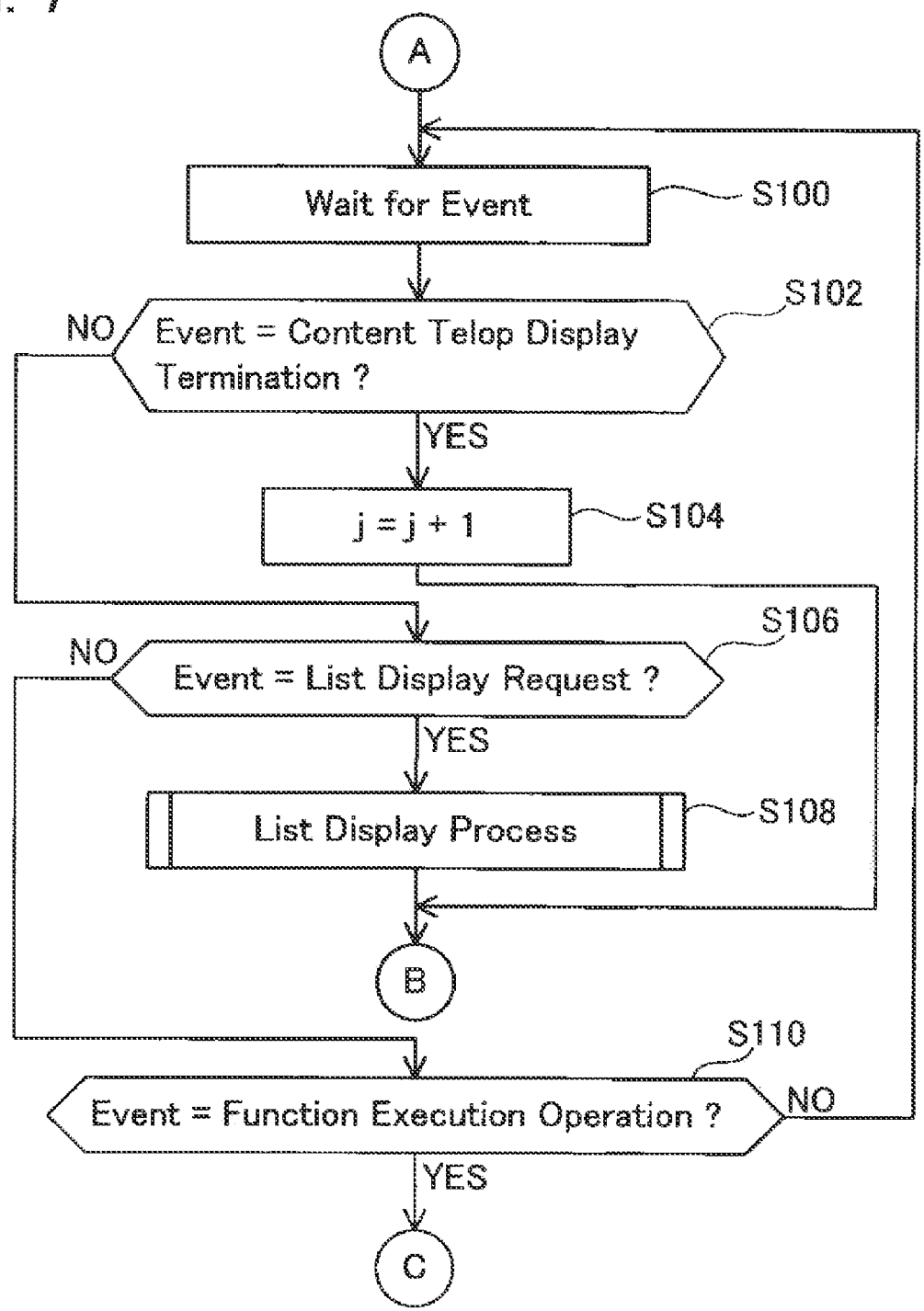
FIG. 7 shows a continuation of the flowchart of FIG. 6.

In the event the answer is NO in S102 of FIG. 7, the CPU 14 determines whether a list display request event has been generated (S106). As shown in the uppermost illustration in FIG. 12, when the content title letter string 162 is displayed as a scrolling display, the user can touch the content title letter string 162. When the user touches the content title letter string 162, the CPU 14 determines that the answer is YES in S106. In the event the answer is YES in S106, the CPU 14 executes the list display process (S108). The details of the list display process will be described in detail below.

In the event the answer is NO in S106, the CPU 14 determines whether a function execution operation has been generated (S110). The user can operate any of the buttons 160 shown in the uppermost illustration of FIG. 12. In this case, the CPU 14 determines that the answer is YES in S110. The CPU 104 executes a process corresponding to the button 160 that was operated (e.g., a fax communication process, a scan process, a copy process, etc.). In this case, the multi-function device 10 shifts to the function execution state, and information relating to the function being executed is displayed on the display panel 50. The CPU 14 returns to S70 of FIG. 6, and stands by until the multi-function device 10 has shifted to the waiting state. In contrast, in the event that the answer is NO in S110, the CPU 14 executes a process in accordance with the event, returns to S100, and waits for the occurrence of the next event.

(List Display Process)

Next, the list display process executed in S108 of FIG. 7 will be explained with reference to FIG. 8. The CPU 14 acquires all the updated content information 132 in the i-th site (the site displayed by the content letter string 162) from the display information storage area 36 of RAM 30 (S120). For example, with the 0-th site in FIG. 4, there are m items of updated content information 132. In this case, m items of updated content information 132 are acquired in S120. Next, the CPU 14 creates list data that includes the site title letter string 122 acquired in S78, each content title letter string 140 acquired in S120, and each content update time 142 acquired in S120 (S122). The CPU 14 sends the list data created in S122 to the display panel 50 (S124). As a result, as shown in the second illustration from the top of FIG. 12, the list 170 is displayed on the display panel 50. The list 170 includes, for each of the plurality of contents (e.g. for each of the in items of contents), content update time for that content and the content title letter string for that content. In the illustration second from the top in FIG. 12, with regard to a content relating to sports, content update time "14:32" and a content title letter string "Sports . . ." are displayed. In addition, in this example, a site title letter string 172 is also displayed. The CPU 14 proceeds to S126 when S124 is completed.

In S126, the CPU 14 waits until an event occurs. If an event occurs, the CPU 14 proceeds to S128. In S128, the CPU 14 determines whether an event related to a content selection operation has occurred. As shown in the second illustration from the top in FIG. 12, when the list 170 is displayed, the user can touch one content (the content title letter string). When the user touches the content, the CPU 14 determines that the answer is YES in S128. In the event the answer is YES in S128, the CPU 14 executes a content display process (S130). The details of the content display process will be described in detail below.

In the event the answer is NO in S128, the CPU 14 determines whether a command to end the list display has been input (S132). When the list 170 is displayed as shown in the second illustration from the top in FIG. 12, the user can touch the button 174. In this case, the CPU 14 determines that the answer is YES in S132. In the event the answer is YES in S132, the CPU 14 ends the list display process, and returns to S84 of FIG. 6. In contrast, in the event the answer is NO in S132, the CPU 14 executes a process in accordance with the event, returns to S126, and waits until an event occurs.

(Content Display Process)

Next, the content display process executed in S130 of FIG. 8 will be explained with reference to FIGS. 9 to 11. The CPU 14 creates display data relating to the content in the i-th site selected in S128 from the display information storage area 36 of RAM 30 (S150). This display data includes the site title letter string 122, the content title letter string 140 of this content, the content update time 142 of this content, and the summarized content letter string 144 of this content. Next, the CPU 14 sends the display data created in S150 to the display panel 50 (S152). Consequently, the screen shown in the lowermost illustration of FIG. 12 is displayed on the display panel 50. This screen includes the site title letter string 172, content update time 180, a content title letter string 182, and a summarized content letter string 184. This screen further includes a view button 186, a delete button 190, and a list clear button 192.

The CPU 14 waits until an event occurs (S154). When an event occurs, the CPU 14 proceeds to S156. In S156, the CPU 14 determines whether the view button 186 has been operated. If the answer is NO, the CPU 14 proceeds to S200 of FIG. 11. If the answer is YES in S156, the CPU 14 determines whether the request from the PC 70 is suspended (S158). In S184 of FIG. 10 or S212 of FIG. 11 (to be described), the request from the PC 70 is suspended. In S158, the CPU 14 determines whether the request has been suspended in S184 of FIG. 10 or S212 of FIG. 11, and then determines whether a state exists where a response to that request has not been sent. Note that the term "request is suspended" refers to a process in which a transmission of response to the request is delayed or postponed.

If the answer is NO in S158, the CPU 14 sends a communication preparation command to the PC 70 (S160). As will be described later, the PC 70 activates the browser 76a when the communication preparation command is received. The activated browser 76a sends a request to the multi-function device 10. The CPU 14 monitors whether this request has been received (S162). If the answer is YES, the CPU 14 executes S164. If the answer is YES in S158, the CPU 14 skips S160 and S162, and executes S164.

Figure 8:
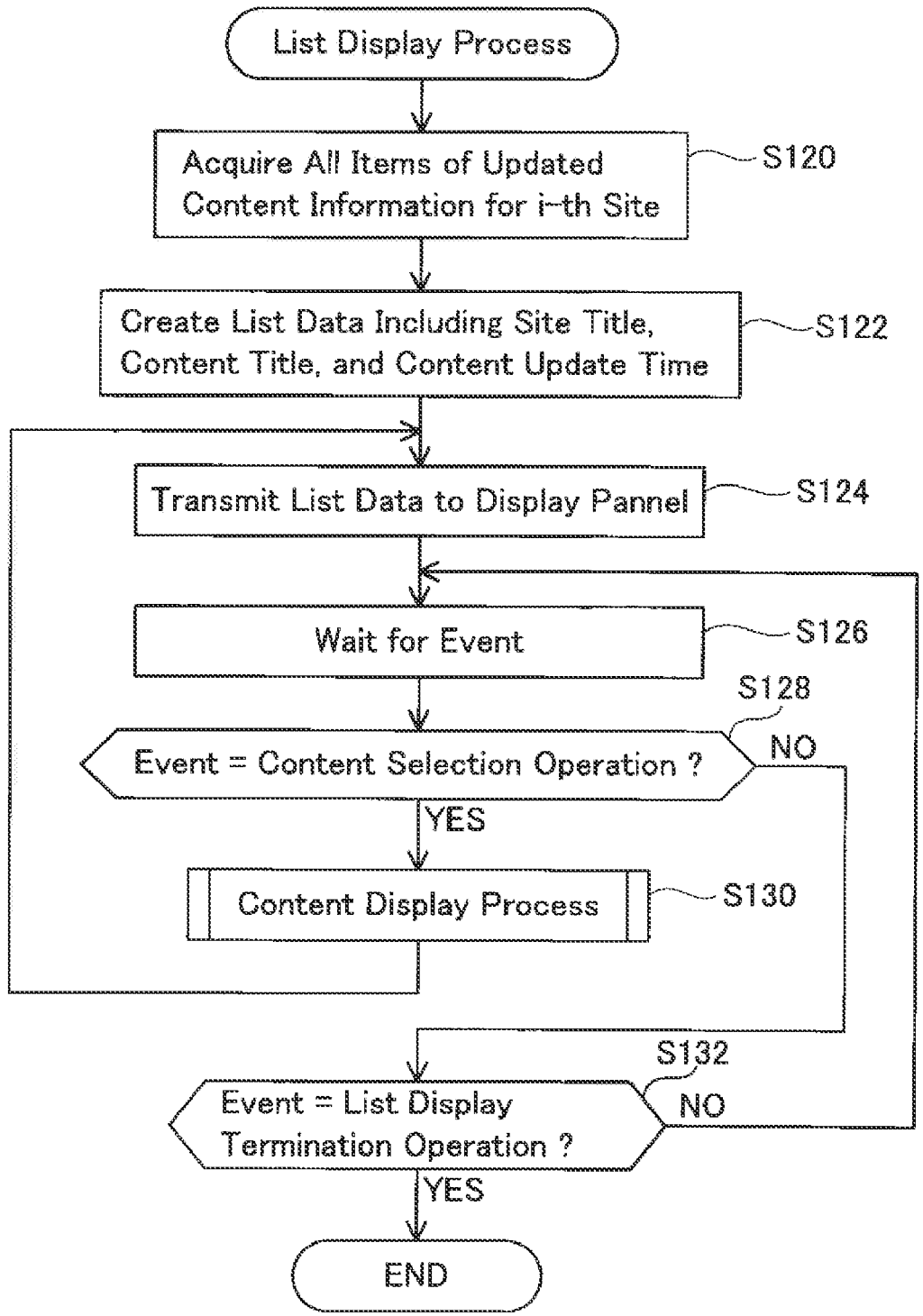
FIG. 8 shows a flowchart of a list display process executed by the multi-function device.

In S164, the CPU 14 specifies the content title letter string 140 and the content URL 146 of the content selected in S128 of FIG. 8 from the display information storage area 36. Next, the CPU 14 sends a content add command to the PC 70 as a response to the request from the PC 70 (S166). This content add command includes the content title letter string 140 and the content URL 146 specified in S164. In the process S166 executed if the answer is YES in S158, the content add command is sent as a response to the suspended request. In the process S166 executed if the answer is NO in S158, the content add command is sent as a response to the request received in S162. S180 of FIG. 10 begins when S166 is completed.

Figure 9:
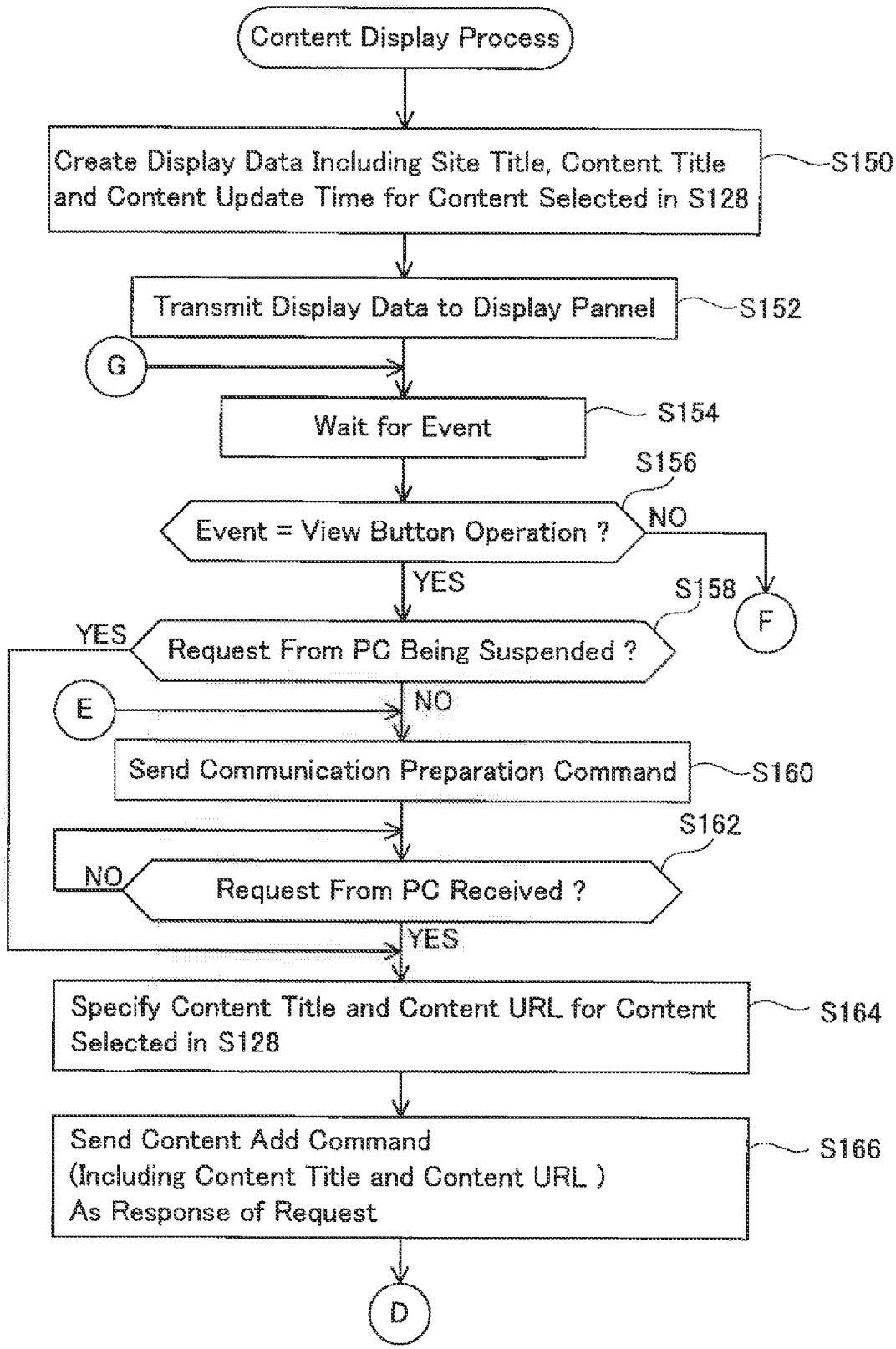
FIG. 9 shows a flowchart of a content display process executed by the multi-function device.
Figure 10:
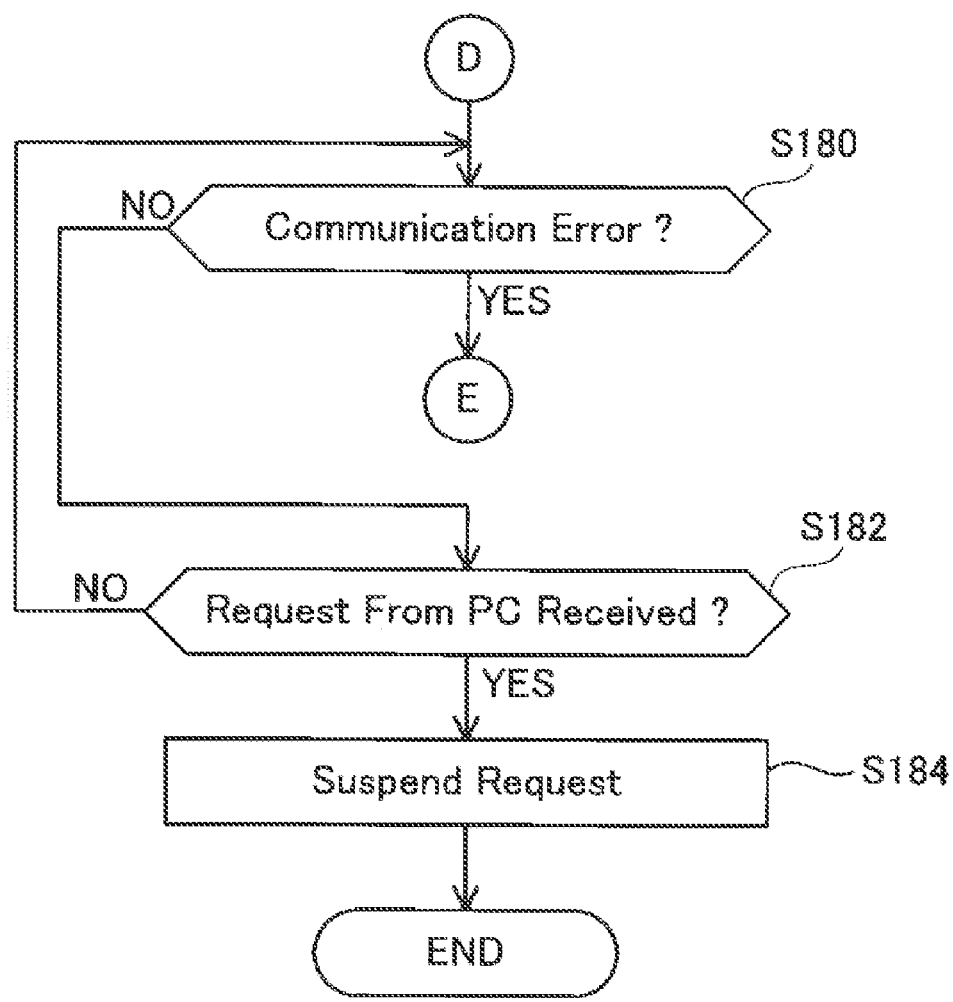
FIG. 10 shows a continuation of the flowchart of FIG. 9.

In S180, the CPU 14 determines whether a communication error has occurred for the content add command sent in S166 of FIG. 9. As will be described later, when the content add command is received, the browser 76a of the PC 70 re-sends the request to the multi-function device 10. If the browser 76a is not activated when the content add command is received, the browser 76a cannot re-send the request to the multi-function device 10. If the request is not received within a predetermined time from the content add command being sent in S166 of FIG. 9, the CPU 14 determines YES in S180. In this case, the CPU 14 returns to S160 of FIG. 9. Consequently, the CPU 14 sends the communication preparation command (S160), receives the request (S162), and re-sends the content add command (S166).

For a predetermined time from the time that the content add command was sent, the CPU 14 monitors whether the request has been received (S182). If the answer is YES, the CPU 14 suspends the request (S184). Specifically in the suspending process, the CPU 14 periodically sends a signal (e.g. an ACK signal) to the PC 70 showing that the request process is ongoing so that the PC 70 does not time out (i.e., so that the PC 70 does not stop monitoring the response to the request). When the suspension of the request has been started in S184, the content display process ends.

Figure 11:
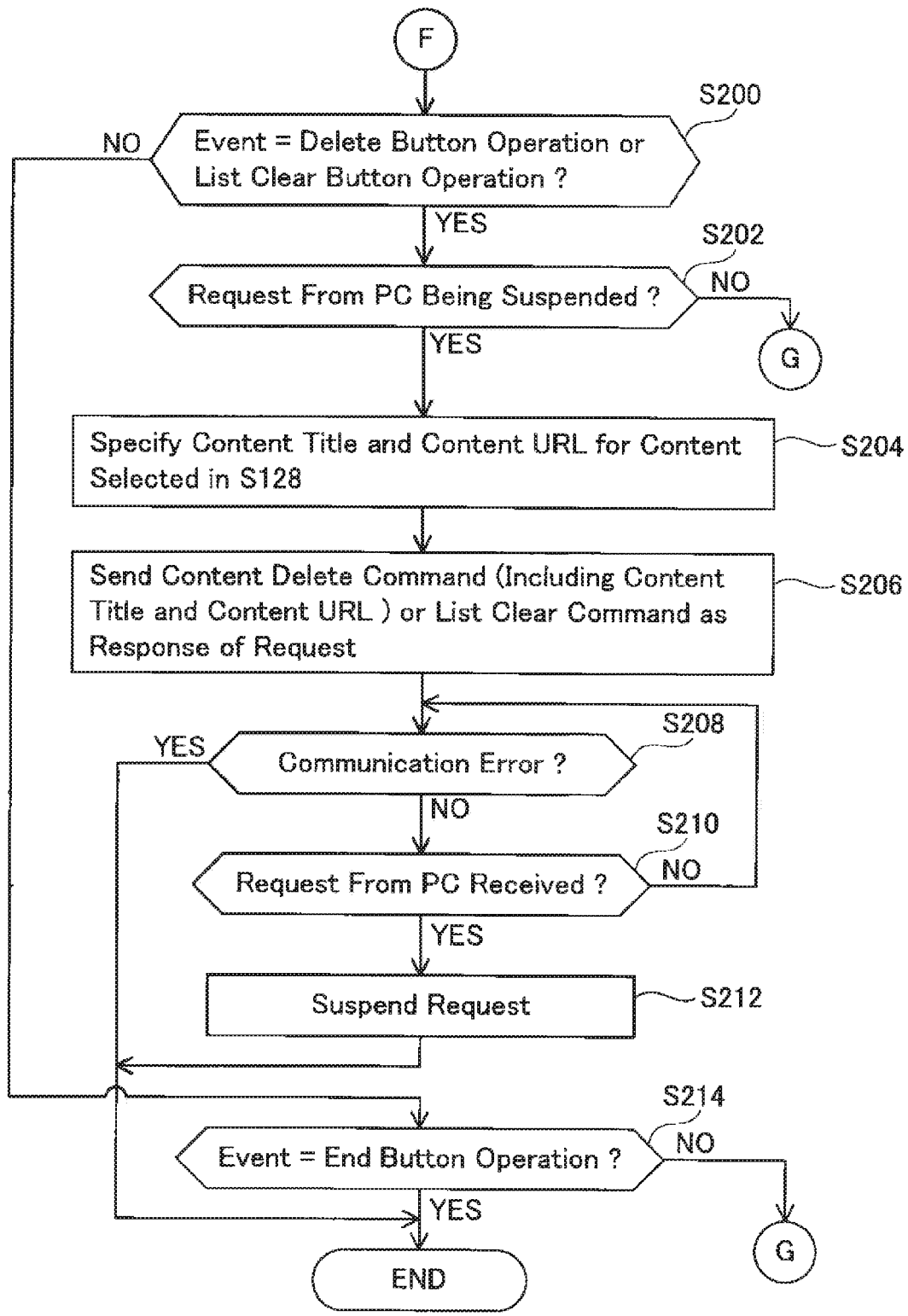
FIG. 11 shows a continuation of the flowchart of FIG. 10.

If the answer is NO in S156 of FIG. 9, the CPU 14 executes S200 of FIG. 11. In S200, the CPU 14 determines whether the delete button 190 or the list clear button 192 (see FIG. 12) has been operated. If the answer is NO, the CPU 14 proceeds to S214. In S214, the CPU 14 determines whether an end button 174 (see FIG. 12) has been operated. If the answer is YES, the content display process ends.

If the answer is YES in S200, the CPU 14 determines whether the request from the PC 70 has been suspended (S202). If the answer is NO, the CPU 14 returns to S154 of FIG. 9 and waits for the next event to occur without executing the processes caused by operation of the delete button 190 or the list clear button 192 (see FIG. 12). If the answer is YES in S202, the CPU 14 specifies the content title letter string 140 and the content URL 146 of the content selected in S128 of FIG. 8 front the display information storage area 36 (S204). This process is identical to S164 of FIG. 9. Next, the CPU 14 sends a content delete command or list clear command to the PC 70 as a response to the request from the PC 70 (S206). The content delete command is sent in the process S206 executed due to operation of the delete button 190 (see FIG. 12). The content delete command includes the title letter string 140 and the content URL 146 specified in S204. The list clear command is sent in the process S206 executed due to operation of the list clear button 192 (see FIG. 12). The list clear command does not include the information specified in S204. Consequently, if the list clear button 192 (see FIG. 12) has been operated, the process S204 may be skipped.

Next, the CPU 14 determines whether a communication error has occurred for the content delete command or list clear command sent in S206 (S208). As with the case of S180 and S182 of FIG. 10, the CPU 14 determines YES in S208 if the request is not received within a predetermined time from the content delete command or list clear command being sent in S206. In this case, the content display process ends. In the case where the answer is YES in S180 of FIG. 10 (if a communication error occurred for the content add command), the CPU 14 has returned to S160 of FIG. 9 and sent the communication preparation command. However, if a communication error has occurred for the content delete command or list clear command, the communication preparation command will not be sent. This is because it is assumed that the browser 76a has already closed in the PC 70, and an object to be deleted or cleared is not displayed.

For the predetermined time from the time that the content delete command or the list clear command was sent, the CPU 14 monitors whether the request has been received (S210). If the answer is YES, the CPU 14 suspends the request (S212). This process is identical to S184 of FIG. 10. When S212 ends, the content display process ends.

(Processes Executed by the PC)
(Browser Activating Software Process)

Next, processes executed by the PC 70 will be explained. First, the process executed by the CPU 72 of the PC 70 in accordance with the browser activating software (termed browser activating software process below) will be explained with reference to FIG. 13.

The CPU 72 monitors whether the communication preparation command has been received front the multi-function device 10 (S230). The communication preparation command is sent from the multi-function device 10 in S160 of FIG. 9. If the answer is YES in S230, the CPU 72 activates the browser 76a (S232). Next, the CPU 72 notifies the browser 76a of the URI of the multi-function device 10 (i.e., the URI of the source of the communication preparation command) (S234).

(Browser Process)

Figure 13:
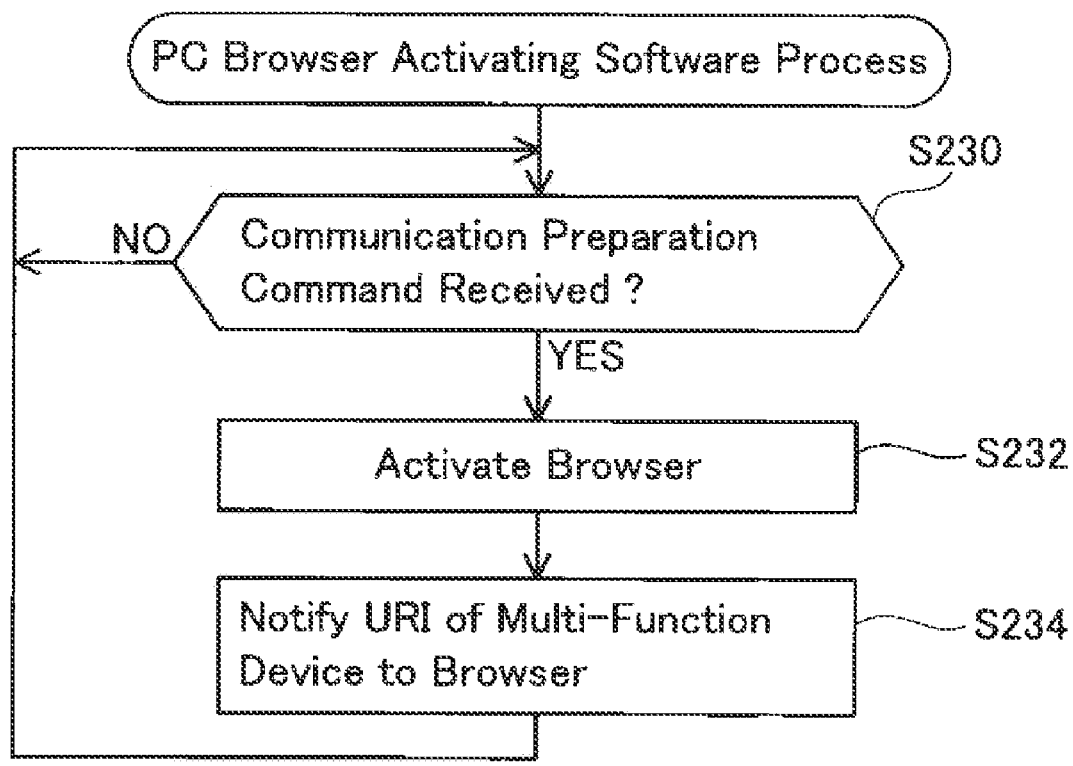
FIG. 13 shows a flowchart of a browser activating software process executed by a PC.
Figure 14:
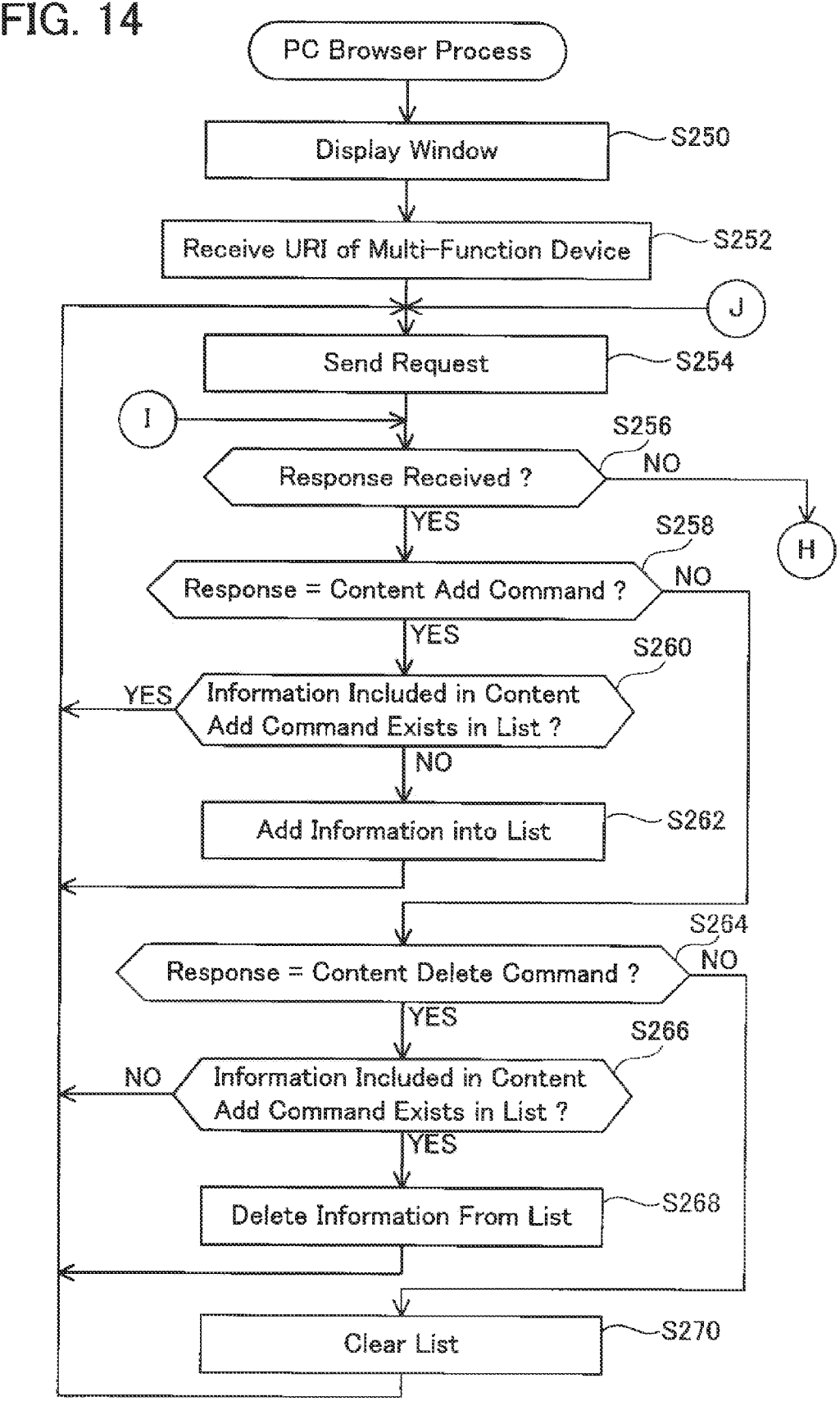
FIG. 14 shows a flowchart of a browser process executed by the PC.

Next, the processes executed by the CPU 72 in accordance with the browser 76a activated in S232 of FIG. 13 (termed browser process below) will be explained. The browser process is a process executed in accordance with the Java Script instruction 86 stored in the other storage area 80. Only the browser 76a activated by the browser activating software 78 executes the browser process in accordance with the Java Script instruction 86. To the contrary, the browser 76a activated by the user performing a predetermined operation on the operation portion 84 (see FIG. 1) does not execute the Java Script instruction 86. Hereinbelow, the browser 76a activated by the browser activating software 78 and the browser 76a activated by the basic program 76 are distinguished in that the former executes the browser process exemplified in FIGS. 14 and 15, whereas the latter does not.

Figure 16:
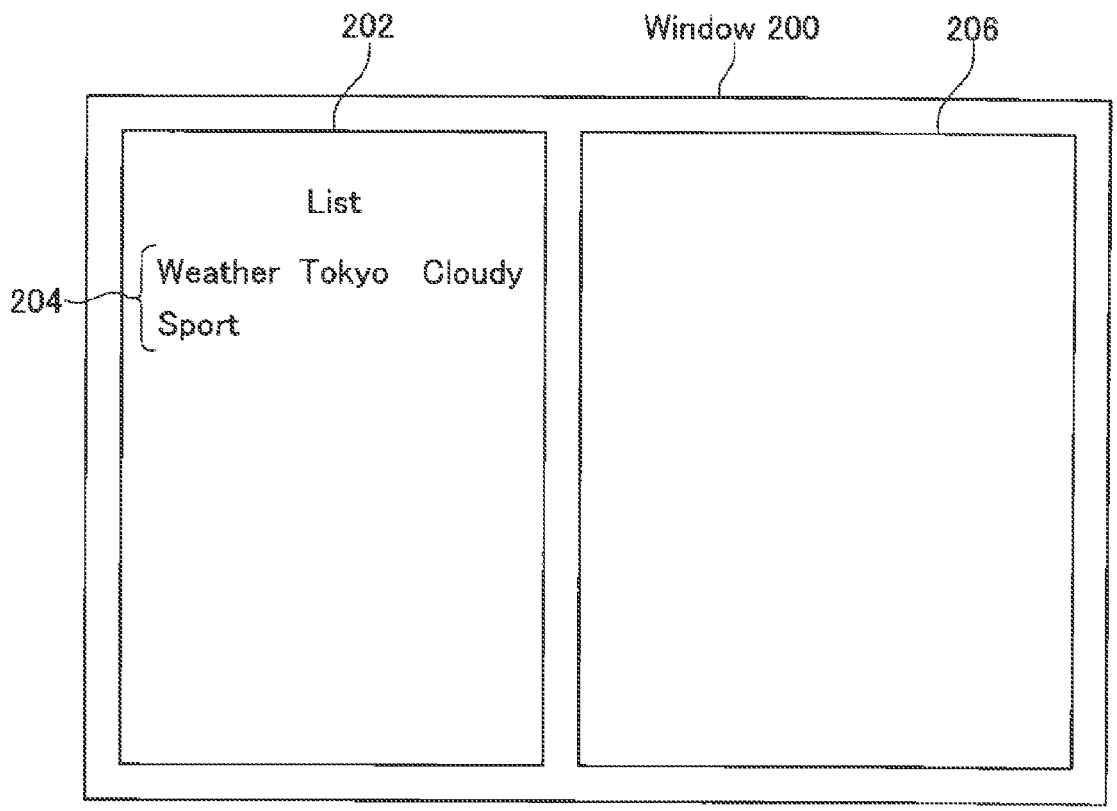
FIG. 16 shows an example of a window displayed by the PC.

The CPU 72 displays a window (S250). This process is executed in accordance with the instruction 86e of the Java Script instruction 86. FIG. 16 shows an example of a window 200. The window 200 includes the list display area 202 and the content display area 206. The list display area 202 is an area for displaying a list of a plurality of content titles 204. Although not shown in FIG. 16, not just the content titles 204 but also content URLs corresponding to the content titles are displayed in the list display area 202. The content display area 206 is an area for displaying contents corresponding to the content title selected in the list display area 202. At the point when the window 200 has just been displayed in S250, the content title 204 is not displayed in the list display area 202, and the contents are not displayed in the content display area 206.

The CPU 72 is capable of acquiring the URI of the multi-function device 10 (S252). That is, the URI of the multi-function device 10 notified (sent) from the browser activating software 78 in S234 of FIG. 13 is received in this step. The browser 76a can thereby learn the destination of a request to be sent in the next step S254. Next, the CPU 72 sends the request to the multi-function device 10 (S254). This process is executed in accordance with the request sending instruction 86a of the Java Script instruction 86. Next, the CPU 72 monitors whether a response has been received from the multi-function device 10 (S256).

If the answer is YES in S256, the CPU 72 determines whether the content add command has been received (S258). The content add command is sent from the multi-function device 10 in S166 of FIG. 9. If the answer is YES in S258, the CPU 72 determines whether the content title and content URL included in the content add command are currently displayed in the list display area 202 (S260). If the answer is NO, the CPU 72 adds and displays the content title and content URL included in the content add command in the list display area 202 (S262). This process is executed in accordance with the list display instruction 86c of the Java Script instruction 86. If S262 has ended, or if the answer is YES in S260, the CPU 72 returns to S254 and re-sends the request to the multi-function device 10. This process is executed in accordance with the request re-sending instruction 86b of the Java Script instruction 86.

If the answer is NO in S258, the CPU 72 determines whether the content delete command has been received (S264). The content delete command is sent from the multi-function device 10 in S206 of FIG. 11. If the answer is YES in S264, the CPU 72 determines whether the content title and content URL included in the content delete command are currently displayed in the list display area 202 (S266). If the answer is YES, the CPU 72 deletes the content title and content URL included in the content delete command from the list display area 202 (S268). This process is executed in accordance with the instruction 86e of the Java Script instruction 86. If S268 has ended, or if the answer is NO in S266, the CPU 72 returns to S254 and re-sends the request to the multi-function device 10. This process is executed in accordance with the request re-sending instruction 86b of the Java Script instruction 86.

In the present embodiment, in response to a request from the PC 70, the multi-function device 10 sends one of the response from among the content add command, the content delete command, and the list clear command. Consequently, if the answer is NO in S264, this means that the list clear command has been received. The list clear command is sent from the multi-function device 10 in S206 of FIG. 11. If the list clear command has been received, the CPU 72 deletes, from the list display area 202, the entire list 204 (all content titles) shown in the list display area 202 (S270). This process is executed in accordance with the instruction 86e of the Java Script instruction 86. If S270 has ended, the CPU 72 returns to S254 and re-sends the request to the multi-function device 10. This process is executed in accordance with the request re-sending instruction 86b of the Java Script instruction 86.

Figure 15:
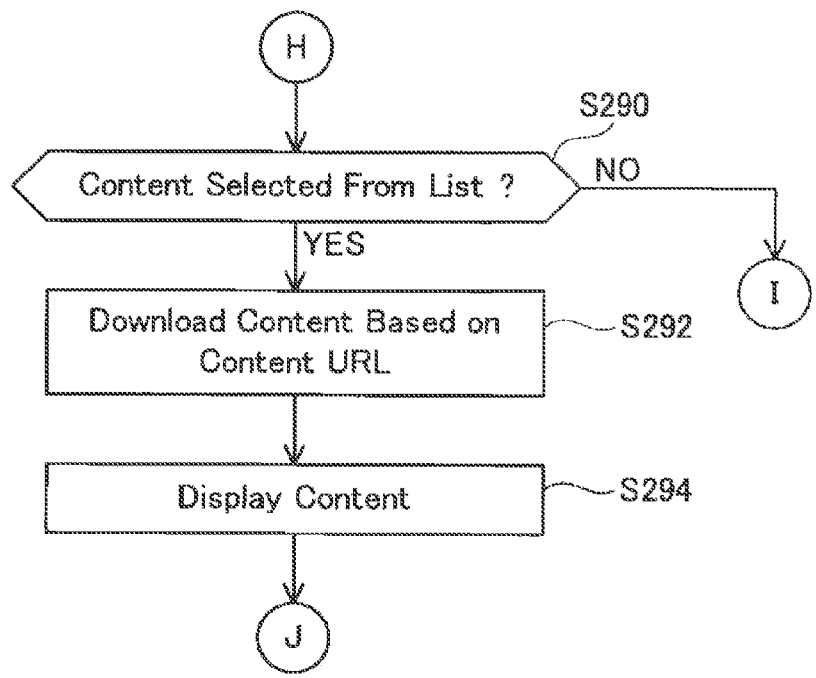
FIG. 15 shows a continuation of the flowchart of FIG. 14.

If the answer is NO in S256, S290 of FIG. 15 begins. In S290, the CPU 72 determines whether one content title 204 has been selected from the list display area 202 (S290). The user can select (e.g. click on) one content title from the list 204 by operating the operation portion 84 of the PC 70. In this case, the CPU 72 determines YES in S290, accesses the content URL set as the content title selected by the user, and downloads the content from that content URL (S292). Next, the CPU 72 displays the content downloaded in S292 in the content display area 206 (S294). The processes S290 to S294 are executed in accordance with the content display instruction 86d of the Java Script instruction 86.

Figure 17:
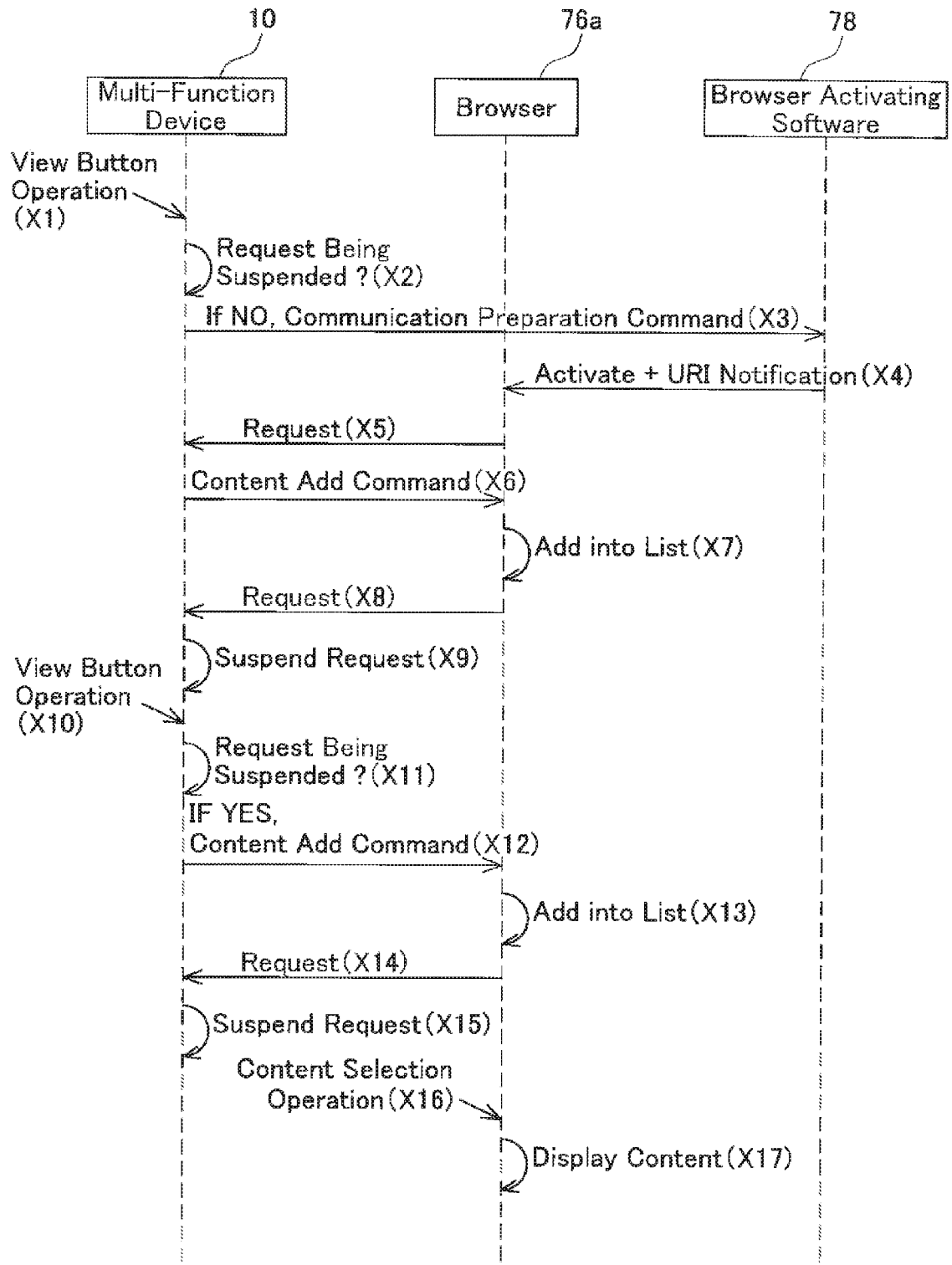
FIG. 17 is a sequence diagram of processes executed by the multi-function device and the PC.
Figure 18:
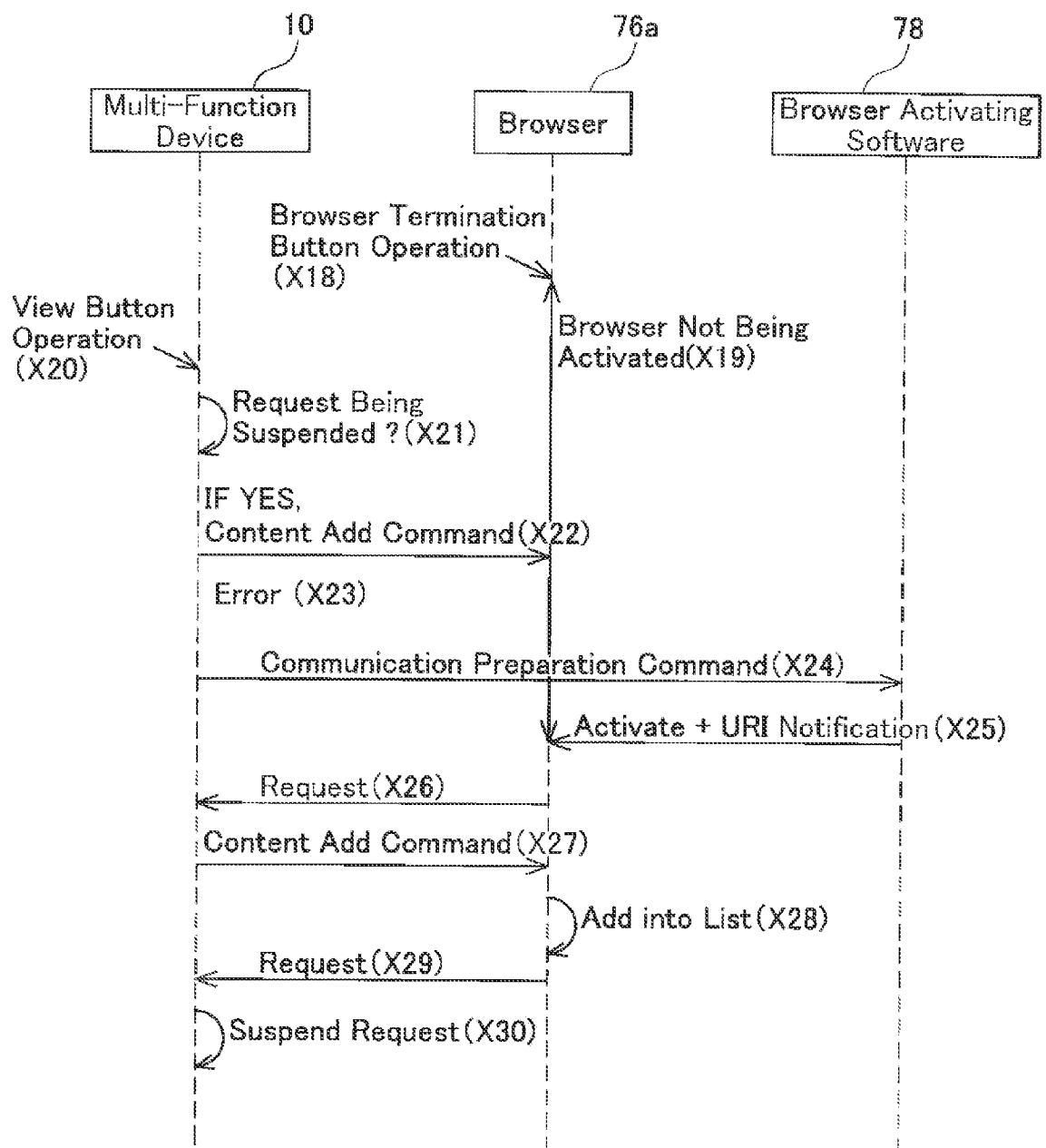
FIG. 18 shows a continuation of the sequence diagram of FIG. 17.

The configuration of the multi-function device system 2 of the present embodiment has been explained in detail. The manner of operating the multi-function device system 2 will be explained utilizing FIGS. 17 and 18. FIGS. 17 and 18 are sequence views of processes executed by the multi-function device 10 and PC 70 (the browser 76a and browser activating software 78).

When the view button 186 (see FIG. 12) is operated in the multi-function device 10 (X1), the multi-function device 10 determines whether the request from the PC 70 has been suspended (X2). X2 corresponds to S158 of FIG. 9. If the request has not been suspended, the multi-function device 10 sends the communication preparation command to the PC 70 (X3). X3 corresponds to S160 of FIG. 9. When the communication preparation command is received, the browser activating software 78 of the PC 70 activates the browser 76a, and the browser 76a is notified of the URI of the multi-function device 10 (X4). X4 corresponds to S232 and S234 of FIG. 13.

The browser 76a of the PC 70 sends a request to the multi-function device 10 (X5). X5 corresponds to S254 of FIG. 14. When the request has been received, the multi-function device 10 sends the content add command including the content title and content URL selected by the user to the PC 70 (X6). X6 corresponds to S166 of FIG. 9. When the content add command has been received, the browser 76a of the PC 70 adds and displays the content title and content URL included in the content add command in the list display area 202 (X7). X7 corresponds to S262 of FIG. 14. Next, the browser 76a of the PC 70 re-sends a request to the multi-function device 10 (X8). X8 corresponds to S254 of FIG. 14.

When the request has been received, the multi-function device 10 suspends the request (X9). X9 corresponds to S184 of FIG. 10. When the view button 186 (see FIG. 12) is operated in the multi-function device 10 (X10), the multi-function device 10 determines whether the request from the PC 70 has been suspended (X11). X11 corresponds to S158 of FIG. 9. If the request has been suspended, the multi-function device 10 sends the content add command to the PC 70 (X12). X12 corresponds to S166 of FIG. 9. Moreover, X13 to X15 are identical to X7 to X9.

When the content title and content URL have been selected from the list display area 202 of the PC 70 (X16), the browser 76a of the PC 70 downloads contents from the content URL selected by the user, and displays these contents in the content display area 206 (X17). X17 corresponds to S292 and S294 of FIG. 15.

When the user executes an operation to close the window 200 opened by the PC 70 (X18, see FIG. 18), the browser 76a ends, and enters a non-activated state (X19). When the view button 186 (see FIG. 12) is operated in the multi-function device 10 (X20), the multi-function device 10 determines whether the request from the PC 70 has been suspended (X21). X21 corresponds to S158 of FIG. 9. If the request has been suspended, the multi-function device 10 sends the content add command to the PC 70 (X22). X22 corresponds to S166 of FIG. 9. Since the browser 76a has been closed, an error occurs for the content add command in the multi-function device 10 (X23). X23 corresponds to S180 of FIG. 10. In this case, the multi-function device 10 sends the communication preparation command to the PC 70 (X24). X24 corresponds to S160 of FIG. 9 executed if the answer is YES in S180 of FIG. 10. Moreover, X25 to X30 are identical to X4 to X9.

Since the display panel 50 of the multi-function device 10 is small, it is difficult to display the entire content. The multi-function device 10 sends the content URL of the contents selected by the user to the PC 70 (X6 or X12). The PC 70 thereby activates the browser 76a (X4). The browser 76a can display the contents (X17). The display portion 82 of the PC 70 is larger than the display panel 50 of the multi-function device 10. The user can see the entire contents on the large display portion 82.

Since the contents can be displayed on the PC 70, the contents need not be displayed on the multi-function device 10. Consequently, a browser program need not be loaded in the multi-function device 10. In the present embodiment, the content URLs are sent from the multi-function device 10 to the PC 70, and the PC 70 downloads the contents. The load on the multi-function device 10 and network can be reduced compared to a configuration in which the multi-function device 10 downloads the contents, and sends the downloaded contents to the PC 70.

The PC 70 activates the browser 76a if the communication preparation command has been received, but does not activate the browser 76a even if the content add command (X6 and X12) is received. In the PC 70, the browser 76a is not activated each time the content URL is received, and a plurality of windows is not opened simultaneously in accordance with a plurality of commands from the multi-function device 10. The multi-function device 10 does not send a new communication preparation command if a request has been suspended, i.e., while the browser 76a is activated in accordance with a past communication preparation command. Consequently, a plurality of windows is not opened simultaneously in accordance with a plurality of commands from the multi-function device 10. The user can consequently easily see information.

(Second Embodiment)

Next, the second embodiment will be described. In the first embodiment, the Java Script instruction 86 is installed on the PC 70 from a computer readable medium. Alternatively, the Java Script instruction 86 is downloaded from a site on the Internet 8 and installed on the PC 70. In the present embodiment, however, the multi-function device 10 stores the Java Script instruction 86 as shown in program 26 of FIG. 2. The multi-function device 10 sends the Java Script instruction 86 to the PC 70 when sending the communication preparation command to the PC 70 in S160 of FIG. 9. The PC 70 thereby stores the Java Script instruction 86 in the storage area 80 (see FIG. 1). According to this feature, the browser 76a can execute processes in accordance with the Java Script instruction 86.

The above embodiments are merely examples. Various modifications can be made to the above embodiments. Variants of the above embodiments are given below.

(1) In the above embodiments, the content servers 90, 91 each store both contents and feed information. However, a server for storing contents and a server for storing feed information may be configured separately.

(2) The multi-function device 10 does not have a browser program. However, the multi-function device 10 may have a browser program. The multi-function device 10 may download contents and display these on the display panel 50.

(3) The PC 70 may activate the browser 76a if a communication preparation command sent from another multi-function device is received while the browser 76a is already activated in accordance with a communication preparation command sent from the multi-function device 10, In this case, a plurality of windows 200 is opened simultaneously.

(4) The multi-function device 10 may be able to or unable to acquire and display contents based on the content URL. In the latter case, the multi-function device 10 need not comprise a browser. In this case, the configuration of the multi-function device 10 can be simplified. In the farmer case, the multi-function device 10 may send a command including the contents acquired based on the content URL to the PC 70 instead of sending the content add command including the content URL. In this case, the PC 70 need not acquire contents from the Internet.

(5) The information displayed in the list 204 of FIG. 16 need not be the titles of the contents. The information displayed in the list 204 may be content location information, or summaries of the contents.

(6) A content may instead be termed "one information from a plurality of information within a site". Each of the plurality of information may correspond to one URL. Consequently, a content may instead be termed "information corresponding to one URL within a site".

(7) The PC 70 may comprise a first browser activation unit for activating the browser in accordance with a communication preparation command from the multi-function device 10, and a second browser activation unit for activating the browser in accordance with the user performing a predetermined operation on the operation portion 84. The first browser activation portion may newly activate the browser 76a in accordance with the communication preparation command even if the browser 76a activated by the second browser activation unit is currently activated.

(8) The multi-function device 10 need not send the communication preparation command. In this case, the PC 70 receives the content add command that is sent each time one title is selected in the multi-function device 10. The PC 70 may activate the browser 76a in accordance with the content add command. However, when the content add command is received, the PC 70 may determine whether the browser 76a activated in accordance with a previous content add command from the multi-function device 10 is currently activated (may determine whether the window 200 is open), and may activate the browser 76a when a negative result is determined, and may not activate the browser 76a when a positive result is determined. In this variant, the content add command is an example of a "first type of command".

What is claimed is:

1. A communication device configured to be connected with an information display device in a communicable manner, the information display device configured to display contents by utilizing a browser, the communication device comprising:
    a processor; and
    a memory storing a computer program including instructions that, when executed by the processor, cause the communication device to function as:
        a location information storage unit configured to store location information of summarized content information, the summarized content information including location information of each content and a title of each content;
        a summarized content information acquiring unit configured to acquire the summarized content information based on the location information of the summarized content information;
        a display control unit configured to cause a display unit to display titles included in the summarized content information;
        a title selection allowing unit configured to allow a user to select at least one title from the titles;
        a location information specifying unit configured to specify, from the summarized content information, location information of content corresponding to the at least one title selected by the user;
        a command sending unit configured to send a first type of command configured to cause activation of the browser by the information display device, and to send a second type of command including the specified location information to the information display device; and
        a determination unit configured to determine, when a first title is selected by the user, whether the browser, which was previously activated based on a previous transmission of the first type of command, is currently closed or activated,
    wherein the command sending unit is configured to, when the first title is selected, send the first type of command at a current time and to send the second type of command including first location information of a first content corresponding to the first title after sending the first type of command at the current time when it is determined that the previously activated browser is currently closed, and
    wherein the command sending unit is further configured to, when the first title is selected, send the second type of command including the first location information at the current time without sending the first type of command when it is determined that the previously activated browser is currently activated.

2. The communication device as in claim 1, wherein each time a title is selected from the titles:
    the location information specifying unit is configured to specify, from the summarized content information, location information of content corresponding to the selected title, and
    the command sending unit is configured to send the second type of command including the location information of the content corresponding to the selected title to the information display device.

3. The communication device as in claim 1, wherein the communication device is further caused to function as:
    a request receiving unit configured to receive a first predetermined request from the information display device when it is determined that the previously activated browser is currently closed, the first predetermined request being a request sent from the information display device when the information display device activates the browser as a result of the information display device receiving the first type of command at the current time,
    wherein the command sending unit is configured to send the second type of command including the first location information to the information display device as a response to the first predetermined request.

4. The communication device as in claim 3, wherein:
    the request receiving unit is further configured to receive a second predetermined request from the information display device, the second predetermined request being a request sent from the information display device when the information display device receives the second type of command including the first location information, the communication device is further caused to function as
a request suspending unit configured to suspend the
second predetermined request, and
when a second title is selected after the first title is selected,
the command sending unit is configured to further send
the second type of command including second location
information of a second content corresponding to the
second title to the information display device as a
response to the suspended second predetermined
request.

5. A content display system comprising:
a communication device; and
an information display device configured to be connected
with the communication device in a communicable
manner, the information display device configured to
display contents using a browser,
wherein the communication device comprises:
a first processor; and
a memory that stores a computer program including first
instructions that, when executed by the first processor,
causes the communication device to function as:
a location information storage unit configured to store
location information of summarized content information, the summarized content information
including location information of each content and
a title of each content;
a summarized content information acquiring unit
configured to acquire the summarized content
information based on the location information of
the summarized content information;
a display control unit configured to cause a display
unit to display titles included in the summarized
content information;
a title selection allowing unit configured to allow a
user to select at least one title from the titles;
a location information specifying unit configured to
specify, from the summarized content information,
location information of content corresponding to
the at least one title selected by the user;
a command sending unit configured to send a first
type of command for activating the browser to the
information display device, and send a second type
of command including the specified location information to the information display device; and
a determination unit configured to determine, when a
first title is selected by the user, whether the
browser, which had been previously activated in
accordance with a previous transmission of the first
type of command, is currently closed or activated,
wherein the command sending unit is configured to
send the first type of command at a current time and
to send the second type of command including first
location information of a first content corresponding to the first title after sending the first type of
command at the current time when it is determined
that the previously activated browser is currently
closed, and
wherein the command sending unit is configured to
not send the first type of command at the current
time and to send the second type of command
including the first location information when it is
determined that the previously activated browser is
currently activated,
wherein the information display device comprises:
a second processor; and
a memory that stores a computer program including
second instructions that, when executed by the second
processor, causes the information display device to
function as:
a command receiving unit configured to receive at
least one of the first type of command and the
second type of command from the communication
device; and
a browser activating unit configured to, when receiving the first type of command at the current time,
newly activate the browser to display the first content by using the first location information included
in the second type of command,
wherein, when the first type of command is not
received at the current time, the browser activating
unit is configured to not newly activate the browser
even if the second type of command is received.

6. One or more non-transitory computer readable media
storing computer readable instructions that, when executed,
cause a communication device to:
store location information of summarized content information, the summarized content information including
location information of each content and a title of each
content;
acquire the summarized content information based on the
location information of the summarized content information;
cause a display unit to display titles included in the summarized content information;
allow a user to select at least one title from the titles; and
specify, from the summarized content information, location information of content corresponding to the at least
one title selected by the user,
wherein the communication device is configured to send a
first type of command configured to cause activation of
a browser by an information display device, and to send
a second type of command including the specified location information to the information display device, and
wherein, when a first title is selected by the user, the communication device is further caused to:
determine whether the browser, which was previously
activated based on a previous transmission of the first
type of command, is currently closed or activated;
send the first type of command at a current time and the
second type of command including first location
information of a first content corresponding to the first
title after sending the first type of command at the
current time when it is determined that the previously
activated browser is currently closed; and
send the second type of command including the first
location information at the current time without sending the first type of command when it is determined
that the previously activated browser is currently activated.

* * * * *